United States Patent [19]
Burkus, II et al.

[11] Patent Number: 5,998,515
[45] Date of Patent: Dec. 7, 1999

[54] LIQUID INJECTION MOLDING SILICONE ELASTOMERS HAVING PRIMERLESS ADHESION

[75] Inventors: Frank S. Burkus, II, Troy; Edward M. Jeram, Burnt Hills; Slawomir Rubinsztajn, Niskuyuna, all of N.Y.

[73] Assignee: General Electric Company, Pittsfield, Mass.

[21] Appl. No.: 08/999,474

[22] Filed: Dec. 29, 1997

[51] Int. Cl.$^6$ ........................................... C08K 5/34
[52] U.S. Cl. ............................... 524/86; 524/99; 524/104; 524/186; 524/236; 524/307; 524/316
[58] Field of Search .................................. 524/307, 316, 524/86, 99, 104, 186, 236

[56] References Cited

U.S. PATENT DOCUMENTS

| | | |
|---|---|---|
| 2,803,619 | 8/1957 | Dickmann . |
| 3,654,215 | 4/1972 | Goossens . |
| 3,817,910 | 6/1974 | Vikmar . |
| 4,539,357 | 9/1985 | Bobear . |
| 4,554,147 | 11/1985 | Stoll et al. . |
| 4,690,967 | 9/1987 | LaGarde et al. . |
| 4,978,696 | 12/1990 | Clark et al. . |
| 5,081,172 | 1/1992 | Chaffee et al. . |
| 5,104,919 | 4/1992 | Okami et al. . |
| 5,110,845 | 5/1992 | Gray et al. . |
| 5,112,885 | 5/1992 | Inoue et al. . |
| 5,122,562 | 6/1992 | Jeram et al. . |
| 5,153,244 | 10/1992 | Akitomo et al. . |
| 5,164,461 | 11/1992 | Mitchell et al. . |
| 5,200,440 | 4/1993 | Takago et al. . |
| 5,219,922 | 6/1993 | Steinberger et al. . |
| 5,248,715 | 9/1993 | Gray et al. . |
| 5,260,364 | 11/1993 | Johnson . |
| 5,276,123 | 1/1994 | King et al. . |
| 5,380,770 | 1/1995 | Doin et al. . |
| 5,486,551 | 1/1996 | Polmanteer . |
| 5,519,082 | 5/1996 | Yoshino . |
| 5,556,919 | 9/1996 | Oyama et al. . |
| 5,569,688 | 10/1996 | Meguriya et al. . |
| 5,597,853 | 1/1997 | Itoh et al. . |
| 5,607,992 | 3/1997 | Chiba et al. . |
| 5,610,213 | 3/1997 | Sumpter et al. . |
| 5,623,028 | 4/1997 | Fitzgerald et al. . |

FOREIGN PATENT DOCUMENTS

| | | |
|---|---|---|
| 0622421 | 11/1994 | European Pat. Off. . |
| 04 339 863 | 11/1992 | Japan . |
| 56 041263 | 5/1998 | Japan . |
| 2056995 | 6/1980 | United Kingdom . |

*Primary Examiner*—Melvyn I. Marquis
*Attorney, Agent, or Firm*—Kenneth S. Wheelock; Michelle Bugbee

[57] ABSTRACT

The compression set of elastomeric silicone compositions, addition cured injection moldable compositions or millable compositions, is reduced by the incorporation of nitrogen compounds wherein the nitrogen possesses at least one organic substituent and the nitrogen is tetravalent wherein the nitrogen is cationic. The adhesion of such compositions to thermoset or thermoplastic polymer substrates is improved by the addition of bis(trimethoxysilylpropyl) fumarate and a disilanol that may or may not contain alkenyl groups.

26 Claims, No Drawings

LIQUID INJECTION MOLDING SILICONE ELASTOMERS HAVING PRIMERLESS ADHESION

The present invention relates both to a process for improving the compression set of cured silicone elastomers and to curable (and cured) translucent, high strength, organopolysiloxane liquid injection molding compositions useful to produce cured silicone rubber articles that exhibit the property of an improved compression set by reason of the addition of a salt of a nitrogen containing organic cation.

BACKGROUND OF THE INVENTION

Liquid injection moldable organopolysiloxane compositions are known and used. A problem with all such compositions is that the hardness, tensile strength, elongation, tear and cure rates are so interdependent among themselves and also with the viscosity of the uncured liquid precursor that it is difficult to improve one property without deleterious effects on the other properties. Additionally, the kinetics and thermochemistry of the liquid injection molding process and the compositions used therewith have been such that only small lightweight articles of manufacture could be made by the techniques of liquid injection molding because of the speed with which the liquid precursor cures once it has been injected into the mold.

Liquid injection molding organopolysiloxane compositions are typically provided as two components that are mixed immediately prior to use. Both components contain alkenyl polymers, fillers, and in some cases resins. The first component contains a platinum catalyst while the second component contains a hydride crosslinker and cure inhibitors. The two components are mixed immediately prior to use in the injection molding apparatus. In addition to providing a so-called formulation pot-life, the inhibitor must prevent curing of the curable composition until the mold is completely filled. Once the mold is completely filled the inhibitor must then allow for a rapid cure of the curable or polymerizable composition in order to ensure a short cycle life.

U.S. Pat. Nos. 3,884,866 and 3,957,713 describe high strength addition cured compositions suitable for low pressure liquid injection molding. These compositions comprise a first component containing a high viscosity vinyl end-stopped organopolysiloxane, a low viscosity vinyl containing organopolysiloxane, filler, and platinum catalyst which is cured by mixing with a second component containing a hydrogen silicone composition. This composition has a low durometer, ca 20–35 Shore A, and moreover it is difficult to increase the durometer or hardness without adversely affecting other properties.

U.S. Pat. No. 4,162,243 discloses compositions similar to the previously referenced compositions but they contain as the most important distinction, fumed silica that has been treated with tetramethyldivinyldisilazane in addition to hexamethyldisilazane (disclosed in the '866 patent). The compositions of the '243 patent cure to elastomers having high hardness with good retention of other properties including strength, elongation, and tear in addition to having a low viscosity in the uncured state.

U.S. Pat. No. 4,427,801 extends the teaching of the '243 patent by incorporating a MM$^{vi}$Q resin in addition to the vinyl containing treated fumed silica. This produces elastomers having even a higher hardness and tear strength but has the disadvantage of higher compression set and lower Bashore resilience. Recently, U.S. Pat. No. 5,674,966 has further improved upon the MM$^{vi}$Q resin technology by incorporating a high alkenyl content silicone resin selected from the group of resins having the formula: $M_yM^{vi}{}_zD_aD^{vi}{}_bT_cT^{vi}{}_dQ$ and $M_yM^{vi}{}_zD_aD^{vi}{}_bT_cT^{vi}{}_d$; preferably described by the formula: $M^{vi}{}_xQ$ resulting in cured rubbers having a faster cure rate, high durometer, high resiliency, better compression set, and improved heat age stability The manufacturing technique of liquid injection molding typically has been limited to small parts, usually materials weighing less than from about 5 to about 50 grams. Advances in technology are allowing liquid injection molded parts to become larger. Larger parts require larger molds. Larger molds require more time to fill the mold with resin and thus curing must be inhibited for longer times in order to allow the mold to fill before cure may be initiated.

Silicone liquid injection molding materials are pumpable blends of silicone oligomers and polymers typically possessing a viscosity ranging from 200,000 to 3,500,000 centipoise (cps) at 25° C. As presently utilized, these materials consist of two components that are mixed in a 1:1 ratio which when catalyzed will cure (or cross-link) to a rubber or elastomer upon heating. The first or "A" component typically contains siloxane polymers, fillers, various additives, and catalyst. The second or "B" component typically also contains siloxane polymers, additives, and fillers but also contains hydrogen siloxanes and cure inhibitors. The physical properties of both the cured and uncured materials depends in a very large degree upon the compositions utilized to generate the "A" and "B" components.

Typical liquid injection molding compositions consisting of the "A" and "B" components together generally are made up of the following ingredients:

1) from 50 to 75 parts by weight of a vinyl stopped polydimethylsiloxane having a viscosity ranging anywhere from 10,000 to 100,000 centipoise and a vinyl content of ranging from approximately 0.05 to 0.15 weight per cent;

2) up to 10 parts by weight of a low molecular weight vinyl stopped vinyl on chain polyorganosiloxane having a viscosity ranging from 200 to 1500 centipoise and a vinyl content of approximately 1.5 weight per cent;

3) up to 10 parts by weight of a low molecular weight mono-vinyl stopped polyorganosiloxane having a viscosity ranging anywhere from 500 to 2,000 centipoise;

4) from 20 to 30 parts by weight of a fumed or pyrogenic silica having a surface area ranging from 150 to 450 m$^2$/gm;

5) from 2 to 50 wppm of Pt hydrosilylation catalyst;

6) from 0.01 to 0.50 parts by weight of an inhibitor compound; and 7) from 100 to 1,000 wppm of silyl hydrides. Additional components may include extending fillers, coloring agents, additives to impart increased performance with respect to certain physical properties such as oil resistance, heat aging, ultra-violet stability and the like.

One particularly desirable attribute of a cured liquid injection molded material is a cured rubber having a high durometer. To obtain a high durometer rubber, one typical solution to this problem is to add a large amount of a filler anywhere from 25 to 70% by weight of the final cured rubber or elastomer. Use of large quantities of filler in a moderately viscous fluid such as the polymers used to prepare the precursor mixtures results in a fluid having high levels of suspended solids that significantly increase the viscosity of the mixture. Fumed silica is routinely used as a reinforcing filler to achieve high durometer in the cured rubber, however, at weight percent levels above 25 weight percent fumed silica, the liquid injection molding compositions become un-pumpable, defeating the purpose of liquid injection molding. Consequently, extending fillers are added and these usually impart color to the finished product. While this is not an undesirable result for many applications, it is occasionally a drawback.

Another approach to achieving a high durometer is to increase the cross link density of the cured rubber. It should be noted that because of the presence of vinyl groups, peroxide cures are not necessarily prohibited. Such formulations require the separate presence of olefinic unsaturation and hydride terminated siloxane species and are catalyzed by noble metal catalysts. While this results in a high crosslink density for the cured rubber, the drawbacks associated with these formulations is that although the desired high durometer is achieved the resulting cured rubbers suffer from very high moduli and very low elongations.

The properties of fabricated rubber depend not only on the chemical nature of the components but also on the properties of the filler, additives, and type of curing catalyst. Consequently, the resultant property profile of a given heat cured or liquid injection molded silicone rubber is highly dependent on the chemical nature of the various constituent components as well as the relative proportions of those components. For example, a high filler content increases hardness and solvent resistance of the resulting rubber. Such increased hardness and solvent resistance however, comes at the price of reduced physical properties such as elongation and tear, depending on the filler.

Not only do the properties of heat cured (i.e. high consistency or millable rubber) or liquid injection molded silicone rubbers vary with the nature of the silicone components and the various additives as well as their respective proportions but the properties also vary as a result of the various procedures used to compound the rubber. Properties of a heat cured rubber may therefore vary as a function of the thoroughness of the mixing and the degree of wetting of the filler by the component. Properties of liquid injection molded silicone rubbers will depend on the nature of the alkenyl and hydride components that form the basis of the elastomeric network, the catalysts employed, fillers and reaction inhibitors. All other factors being equal, a hydrophilic filler as opposed to a hydrophobic filler will impart significantly different properties to a finished rubber.

Further, properties of heat cured or liquid injection molded rubbers change with time. This is particularly true during the initial periods of the curing reaction. Since silicone rubbers are complex chemical mixtures, the cure reactions and associated side reactions never completely stop although they may slow down considerably after the initial cure. The properties of a heat cured or liquid injection molded rubber thus change slowly with age, preferably as slowly as possible.

Silicone rubbers may be cured by one of three general curing techniques:

1) hydrosilylation,
2) free radical initiation, and
3) high energy radiation initiation.

For a hydrosilylation cure, high molecular weight polymers possessing a vinyl functionality are usually reacted with low molecular weight hydride-functional cross-linking agents. A stable platinum complex, functioning as a catalyst, is added along with an inhibitor to prevent cure initiation prior to heating. The reaction proceeds at room temperature, increasing reaction rate as the temperature is increased, to form a cross linked addition polymer.

Free radical curing of silicone rubbers is effected by heating the rubber precursor in the presence of a free radical initiator such as benzoyl peroxide. The predominant mechanism operating involves hydrogen abstraction from the methyl groups of the dimethylsiloxane moiety followed by radical attack on another methyl group creating a cross-linking ethylene bridge. If a small percentage of vinyl groups are present, the methyl radical can add to the vinylic double bond. In addition to benzoyl peroxide, other radical cure initiators include bis(2,4-dichlorobenzoyl)peroxide, tert-butyl peroxybenzoate, dicumyl peroxide, 2,5-dimethyl-di-(tert-butylperoxy)hexane, and 1,1-di-(tert-butylperoxy)-trimethylcyclohexane. Both 2,5-dimethyl-di-(tert-butylperoxy)hexane, and 1,1-di-(tert-butylperoxy)-trimethylcyclohexane are particularly useful and specific as free radical cure initiators for vinyl silicone heat cured rubbers.

High energy radiation, either as gamma rays or as an electron beam, can also effect cures. This type of cure causes a wide variety of bonds to be broken, thus cross-links occur between a variety of different atomic centers as the radicals created by the high energy recombine to form new chemical bonds.

When a heat cured or liquid injection molded rubber formulation is used to manufacture products such as gaskets, the particular end use and the environment of that end use govern how the material is formulated and processed. In the case of gaskets, compression set, sealing force, and retention of sealing force are important measures of performance. Compression set has been a significant factor in heat cured or liquid injection molded rubber technology for many years.

U.S. Pat. No. 2,803,619 discloses a polydimethylsiloxane gum filled with fumed silica and diatomaceous earth having a low compression set. The heat cured rubber of the '619 patent was cured by a peroxide initiated vulcanization lasting five minutes at 150° C. followed by a twenty-four hour cure at 250° C. The compression set was measured according to ASTM D-395 after being compressed to 75% of its original thickness for 22 hours at 150° C. Subsequent to the '619 patent, post-bake curing times have been significantly reduced to conditions that avoid thermal decomposition of the silicone, e.g. 4 hours at 200° C. as taught in U.S. Pat. No. 4,774,281. Such post-preparation finishing steps to control compression set add significantly to the cost of the materials.

Curing of a heat cured or liquid injection molded rubber begins when the cure is initiated during the molding process. The cure must be sufficiently rapid that the article can be removed from the mold without deformation. Yet the requirement that the finished product possess elastomeric properties in some degree means that the cure cannot proceed to the extent that the initially elastomeric heat cured or liquid injection molded rubber is no longer deformable. Thus the kinetics of the cure reaction must be carefully balanced for a rapid initial cure.

Subsequent developments have focused on three technical issues:

1) in-situ filler treatment,
2) post-reaction catalyst inhibition, and
3) additives.

In-situ filler treatment may be divided into two broad classes: 1) hexamethyldisilazane and vinyl silazane treatment of the filler, and 2) hexamethyldisilazane and vinyl alkoxy silane treatments.

In the case of free-radical cures, generally peroxide initiated, the initiator is consumed. Use of gamma radiation or high energy electron beams also leaves no reactive residues in the rubber. When a hydrosilylation catalyst is used to effect a cure in a vinyl-hydride compound rubber, the cure must be controlled because the catalyst is not destroyed by the cure reaction. Thus a large variety of inhibitor compounds have been used: alkaline earth metal silicates (U.S. Pat. No. 3,817,910), metal sulfides (U.S. Pat. No. 5,219,922), boron compounds (U.S. Pat. No. 4,690,967), and various organic compounds (U.S. Pat. No. 5,153,244). Catalyst residues that remain in a heat cured or liquid injection molded rubber may continue to function catalytically leading to low levels of continuous cross linking reactions that deleteriously affect compression set.

Additives to heat cured or liquid injection molded rubbers to control compression set have most frequently involved the addition of substituted silicone resins. Recently, in sharp contrast, spinels have been used to control compression set (U.S. Pat. No. 5,260,364). Since the silicone resins added to the heat cured or liquid injection molded rubber formulation for compression set control are highly branched silicone resins, depending on when these resins are added can sometimes lead to the conclusion that these materials form part of the elastomeric matrix of the heat cured or liquid injection molded rubber.

A current problem not yet fully solved by the art deals with the incompletely reacted surface silanol groups of the various silica fillers currently in use. The presence of reactive, i.e. unreacted, surface hydroxyl or silanol groups in silica leads to condensation reactions and structuring of the silica component. One solution currently in use is to use silanol or methoxy stopped silicone fluids as blending agents to assist in dispersing the filler into the silicone component and also provide a reaction center that does not lead to structuring of the filler. In a sense, these blending agents are reactive diluents as they react with the filler surface hydroxyl or silanol groups preventing the condensation reactions between filler particles or filler and gum molecules that lead to stiffening and a loss of elastomeric properties.

U.S. Pat. No. 5,610,213 discloses control of the compression set of cold processable heat curable rubbers by means of controlling the density of unreacted surface hydroxyl groups of a fumed silica filler. Satisfactory values for the compression set are obtained when a fumed silica filler functioning as a reinforcing filler, having a BET surface area in the range of 90–400 m²/gm has a residual level of surface hydroxyl groups determined by nitrogenous base chemisorption and magic angle spinning solid state nmr as being below a threshold value of 3.1 hydroxyl groups/nm².

U.S. Pat. No. 5,569,688 ('688) discloses the use of ammonia generating additives to control the compression set of liquid injection molded or heat cured rubbers. Thus aqueous ammonia, urea and other compounds capable of generating ammonia by thermal decomposition as well as compounds that generate ammonia by chemical decomposition, such as hexamethyldisilazane are used to lower the compression set values for cured liquid injection molded silicone rubbers. U.S. Pat. No. 5,486,551 ('551) discloses the use of ammonium carbonate and ammonium formate as compression set additives, compounds which thermally degrade to liberate ammonia. In contrast to other art that recommends the use of fumed silica as a reinforcing filler in heat curable or liquid injection molded silicone rubber systems, both the '688 and the '551 use precipitated silica as a filler.

SUMMARY OF THE INVENTION

The present invention provides for a curable silicone elastomer composition comprising:

1) a silicone elastomer;
2) a salt of a cationic organic nitrogen compound;
3) bis(trimethoxysilylpropyl)fumarate; and
4) a silanol terminated polymer having the formula:

$$(HO(R^{A1})_2SiO_{1/2})_2(R^{A2}R^{A3}SiO_{2/2})_{x'}(R^{A4}R^{A5}SiO_{2/2})_{y'}$$

where each of $R^{A1}$, $R^{A2}$, $R^{A3}$, and $R^{A4}$, is independently a one to forty carbon atom monovalent organic radical and $R^{A5}$ is a two to forty carbon atom monovalent olefinic organic radical where the subscript y' may range from 0 to about 50 and the subscript x' may range from 0 or 1 to about 100, and a weight percent alkenyl content that ranges from zero when the subscript y' is zero to about 25 weight percent when the subscript y' is greater than zero wherein the compression set of the cured silicone elastomer is less than the compression set of the cured silicone elastomer free of said nitrogen compound. The present invention also provides that the low compression set salt is preferably selected from the group of salts comprising a cationic nitrogen cation having the formulas:

1) a monovalent cation having the formula:
$R^{N1}_a R^{N2}_b R^{N3}_c R^{N4}_d N^+$ where $R^{N1}$ is selected from the group consisting of hydrogen and one to forty carbon atom monovalent organic radicals and $R^{N2}$, $R^{N3}$, and $R^{N4}$ are each independently selected from the group consisting of one to forty carbon atom monovalent organic radicals with the subscript a having values ranging from 0 to 3 and the subscripts b, c, and d independently having values ranging from 0 to 4 subject to the limitation that a+b+c+d is always equal to 4;

2) cations of cyclo-aliphatic nitrogen heterocycle having the formula:

$$((CH_{2-e}Q_e)_fNR^{N5}_gH_{2-g}$$

where the subscript e is 0, 1 or 2, Q is a one to forty carbon atom monovalent organic radical, the subscript f is an integer of 4 or greater, $R^{N5}$ is a one to forty carbon atom monovalent organic radical and the subscript g is 0, 1 or 2;

3) cations of cyclo-aromatic nitrogen heterocycle compounds having the formula:

$$((CH_{1-h}Q_h)_iNR^{N6}_jH_{2-j}$$

where the subscript h is 0 or 1, Q is a one to forty carbon atom monovalent organic radical, the subscript i is an integer of 5 or greater, $R^{N6}$ is a one to forty carbon atom monovalent organic radical and the subscript j is 0 or 1; and 4) a cation of a nitrogen compound containing a nitrogen double-bonded to a carbon atom.

The present invention also provides for a curable silicone elastomer comprising:

1) an alkenyl organopolysiloxane and
2) a hydrogen containing silicon compound selected from the group consisting of hydrogen containing silanes and hydrogen containing organopolysiloxanes.

The present invention provides that the curable silicone compositions of the present invention adhere to a substrate. The substrate may be a thermoset or a thermoplastic. The thermoset or thermoplastic substrates may be polymers.

DETAILED DESCRIPTION OF THE INVENTION

We now disclose that the addition of a salt of a cationic organic nitrogen compound said nitrogen compound preferably selected from the group consisting of nitrogen compounds 1) containing a monovalent cation having the formula: $R^{N1}_a R^{N2}_b R^{N3}_c R^{N4}_d N^+$ where $R^{N1}$ is selected from the group consisting of hydrogen and one to forty carbon atom monovalent organic radicals and $R^{N2}$, $R^{N3}$, and $R^{N4}$ are each independently selected from the group consisting of one to forty carbon atom monovalent organic radicals with the subscript a having values ranging from 0 to 3 and the subscripts b, c, and d independently having values ranging from 0 to 4 subject to the limitation that a+b+c+d is always equal to 4;

2) cyclo-aliphatic nitrogen heterocycle cations that may be cations of single ring or multi-ring heterocyclic compounds, typically having the formula:

where the subscript e is 0, 1 or 2, Q is a one to forty carbon atom monovalent organic radical, the subscript f is an integer of 4 or greater, $R^{N5}$ is a one to forty carbon atom monovalent organic radical and the subscript g is 0, 1 or 2;

3) cyclo-aromatic nitrogen heterocycle compounds that may be cations of single ring or multi-ring heterocyclic compounds, typically having the formula:

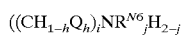

where the subscript h is 0 or 1, Q is a one to forty carbon atom monovalent organic radical, the subscript i is an integer of 5 or greater, $R^{N6}$ is a one to forty carbon atom monovalent organic radical and the subscript j is 0 or 1;

4) double-bonded nitrogen cations such as guanidinium and the like; to a silicone composition suitable for making either a millable rubber or a pumpable liquid injection molding composition improves the compression set over an identical composition wherein the nitrogen compound is absent. Applicants recognize that cations do not generally exist in the absence of anions. However, the anions selected to perform the function of a neutralizing counter ion may be any known anion that does not catalyze the decomposition of the cationic nitrogen ions of the present invention subject to the further limitation that the resulting salt does not decompose the silicone elastomers where the effect of a reduced compression set is desired. Suitable anions include, but are not limited to fluoride, chloride, bromide, iodide, sulfate, bisulfate, sulfite, bisulfite, carbonate, bicarbonate, carboxylates such as acetate, propionate, and the like, nitrate, nitrite, phosphate, phosphite, borate, tetrafluoroborate, antimonate, arsenate, chlorate, bromate, iodate, hypochlorite, hypobromite, and hypoiodite.

The liquid injection molding formulations useful with the present invention comprise:

(A) 100 parts by weight of an alkenyl, preferably vinyl containing polyorganosiloxane component comprising:
(1) 70 to 98 parts by weight of a linear high viscosity alkenyl or vinyl end-stopped organopolysiloxane having no more than 25 mole percent of phenyl radicals and having a viscosity of from about 2,000 to about 1,000,000 centipoise at 25° C.,
(2) 1 to 15 parts by weight of a linear low viscosity organopolysiloxane having at least one terminal alkenyl group per molecule, having an alkenyl or vinyl content that may vary from 0.01 mole percent alkenyl or vinyl to 60 mole percent alkenyl or vinyl, having a viscosity that varies from 50 to about 5,000 centipoise at 25° C. and having no more than 25 mole percent phenyl radicals, and,
(3) 1 to 15 parts by weight of an alkenyl or vinyl on chain organopolysiloxane having from about 0.1 to about 25 mole percent alkenyl or vinyl, having a viscosity that varies from about 50 to 10,000 centipoise at 25° C. and having no more than about 25 mole percent phenyl radicals;
(B) from about 5 to about 70 parts by weight of a filler;
(C) from about 0.1 to 50 parts per million of the total organopolysiloxane composition of a platinum catalyst;
(D) from about 0.1 to 10 parts by weight a SiH composition selected from the class consisting of hydrogen containing silanes and hydrogen containing organopolysiloxane;
(E) optionally, from about 0.1 to about 6.0 parts by weight of a hydroxy containing organopolysiloxane fluid having a viscosity ranging from about 5 to about 100 centipoise at 25° C. or hydroxy containing organopolysiloxane resin having a viscosity ranging from about 100 to about 15,000 centipoise at 25° C.; and
(F) from about 0.001 to about 1.0 parts by weight per weight of the total liquid injection molding fluid of an injection molding inhibitor compound or compounds.

This composition may be either cured to an elastomer at room temperature for several hours or may be cured at elevated temperatures, such as, for example, 150–200° C. for 10 seconds. In one embodiment, the above composition is a two-component composition where the first component, contains at least all of ingredient (C), and the second component, contains all of ingredient (D) and the inhibitor compound(s) F.

The linear high viscosity alkenyl or vinyl end-stopped organopolysiloxane, A(1), has no more than 25 mole percent of phenyl radicals and a viscosity of from about 2,000 to about 1,000,000 centipoise 25° C., preferably from about 10,000 to about 500,000 at 25° C. These high viscosity organopolysiloxanes may be represented by the general formula:

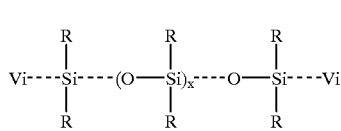

(1)

where Vi stands for alkenyl or vinyl, R is selected from the group consisting of monovalent hydrocarbon radicals and halogenated monovalent hydrocarbon radicals having up to about 20 carbon atoms, and x may vary from about 100 to about 10,000 or even higher, preferably ranging from about 500 to about 2,000. Suitable high viscosity organopolysiloxanes are disclosed in U.S. Pat. No. 3,884,866 hereby incorporated by reference.

The linear low viscosity organopolysiloxane, A(2), has at least one terminal alkenyl or vinyl group per molecule, an alkenyl or vinyl content that may vary from about 0.01 mole percent vinyl to about 60 mole per cent vinyl, preferably from about 0.05 to about 10 mole percent alkenyl or vinyl, a viscosity that varies from about 50 to about 5,000 centipoise at 25° C., preferably from about 50 to 1,000 centipoise at 25° C.; and no more than about 25 mole percent phenyl radicals. These low viscosity organopolysiloxanes may be represented by the general formula:

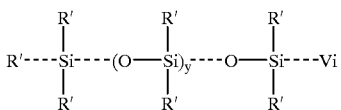

(2)

wherein R' is selected from the group consisting of monovalent hydrocarbon radicals having up to about 20 carbon atoms, halogenated monovalent hydrocarbon radicals having up to about 20 carbon atoms, and alkenyl or vinyl, Vi is alkenyl or vinyl, and y may vary from about 1 to about 750. Suitable low viscosity organopolysiloxanes are disclosed in U.S. Pat. No. 3,884,886 hereby incorporated by reference.

The alkenyl or vinyl on chain organopolysiloxanes, A(3), is important to obtaining the desired properties. Suitable alkenyl or vinyl on chain organopolysiloxanes have from about 0.1 to about 25 mole percent alkenyl or vinyl and preferably from about 0.2 to about 5 mole percent alkenyl or vinyl, a viscosity that varies from about 50 to about 100,000 centipoise at 25° C., preferably from about 100 to about 10,000 centipoise at 25° C., and no more than about 25 mole percent phenyl radicals. These organopolysiloxanes may be characterized as copolymers of (I) organosiloxane units having the formula:

(3)

wherein R is selected from the group consisting of monovalent hydrocarbon radicals and halogenated monovalent hydrocarbon radicals having up to about 20 carbon atoms, $R^{2'}$ is an olefinic hydrocarbon radical attached to silicon by a C—Si linkage, and generally contains from 1 to about 20 aliphatic carbons, either straight chain or branched, and preferably from 1 to about 12 carbon atoms linked by multiple bonds, with the stoichiometric subscript f ranging from a value of 0 to about 2 inclusive, and the sum of the stoichiometric subscripts f and g ranges from about 0.8 to about 3.0 inclusive, and copolymers of (II) organopolysiloxane units having the structural formula:

(4)

wherein R is selected from the group consisting of monovalent hydrocarbon radicals and halogenated monovalent hydrocarbon radicals having up to about 20 carbon atoms, and the stoichiometric coefficient h ranges in value from about 0.85 to about 2.5, inclusive. $R^{2'}$ may be for example, allyl, methallyl, butenyl, pentenyl, hexenyl, heptenyl, octenyl, ethenyl, and the like, but is preferably vinyl. The copolymer of (I) and (II) generally contains from about 0.5 to 99.5 mole percent of the compound of formula (3) above and from about 0.5 to 99.5 mole percent of the compound of formula (4) above. The preparation of these copolymers is well known in the art, as is taught in U.S. Pat. Nos. 3,436,366 and 3,344,111 hereby incorporated by reference.

Preferred alkenyl or vinyl on chain organopolysiloxanes are linear and have the general formula:

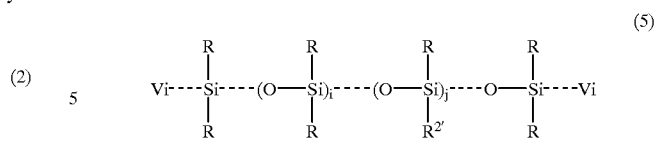

(5)

wherein R is selected from the group consisting of monovalent hydrocarbon radicals and halogenated monovalent hydrocarbon radicals having up to about 20 carbon atoms, $R^{2'}$ is an olefinic hydrocarbon radical attached to silicon by a C—Si linkage, and generally contains from 1 to about 20 aliphatic carbons, either straight chain or branched, and preferably from 1 to about 12 carbon atoms linked by multiple bonds, and i and j are positive integers such that the polymer contains up to approximately 20 mole percent $R^{2'}$. Vi is alkenyl or vinyl. Preferably $R^{2'}$ is vinyl but may also be alkenyl, then the polymer contains from 0.05 to 10 mole percent $R^{2'}$, and the viscosity ranges from about 300 to about 1000 centipoise at 25° C.

As previously recited, R is selected from the group consisting of monovalent hydrocarbon radicals and halogenated monovalent hydrocarbon radicals having up to about 20 carbon atoms, that is radicals normally associated as substituent groups for organopolysiloxanes. Thus the radical R may be selected from the class consisting of mononuclear and binuclear aryl radicals such as phenyl, tolyl, xylyl, benzyl, naphthyl, alkylnaphthyl and the like; halogenated mononuclear and binuclear aryl radicals such as chlorophenyl, chloronaphthyl and the like; mononuclear aryl lower alkyl radicals having from 0 to 8 carbon atoms per alkyl groups such as benzyl, phenyl and the like; lower alkyl radicals having from 1 to, 8 carbon atoms such as methyl, ethyl, propyl, butyl, pentyl, hexyl, heptyl, octyl and the like either as straight or branched chain alkyl substituents, lower alkenyl radicals having from 2 to 8 carbon atoms such as vinyl, allyl, and 1-propenyl; halo lower alkyl radicals having from 1 to 8 carbon atoms such as chloropropyl, trifluoropropyl, and cycloalkyl radicals such as cyclobutyl, cyclopentyl and cyclohexyl. Though R may be any of the above, persons skilled in the art will readily recognize that not every R can be a high molecular weight radical and that R should be chosen so as to not adversely affect the vinyl group reactions. Preferably R is a lower alkyl radical of 1 to 8 carbon atoms, such as methyl, ethyl, and phenyl trifluoropropyl. More particularly, R, is at least 70 percent by number methyl.

The SiH component, (D), serves as a cross linking agent and may be selected from the class consisting of hydrogen containing silanes and hydrogen containing organopolysiloxanes. Hydrogen containing organopolysiloxane can be characterized as copolymers containing at least one unit per molecule having the formula:

(6)

where the remaining siloxane units in the organopolysiloxane are within the scope of formula (4) above, with the notable exception that the R of formula (4) as well as the R herein should be saturated, f has a value ranging from 0 to about 2, inclusive; and the sum of k and m ranges from about 0.8 to about 3.0. The viscosity of the hydrogen containing organopolysiloxane should range from about 5 to about 100 centipoise at 25° C.

Included with the hydrogen containing organopolysiloxane described above are MQ resins having units of, for example, $M(R)_2$, $SiO_{1/2}$ and $SiO_2$. Also included therein are MDQ, MTQ, MDT, MTQ, and MDTQ resins with hydrogen substitution. Thus copolymer generally contains from 0.5 to 99.5 mole percent of the units of formula (6) and from 99.5 mole percent of the units of formula (4).

The compounds, oligomers, resins or fluids designated MQ, MDQ, MTQ, MDT, MDTQ, and MT refer to the nomenclature explained in the research monograph by H. A. Liebhafsky, "Silicones Under the Monogram," published by Wiley—Interscience division of John Wiley and Sons, New York (publication date 1978) at pages 99 and following. In the context of the present invention, substitutional isomerization such as M' being different from M but functioning as an "M" in terms of polymer building blocks as well as D' and D, T' and T, and Q' and Q, likewise; there being many varieties of each type of building block, are all encompassed by the simple shorthand notation referred to in the reference and herewith assume the same variability with respect to composition while retaining their respective M, D, T, and Q functionality.

A preferred hydrogen containing organopolysiloxane is a linear organopolysiloxane of the formula:

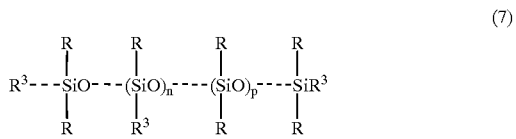

(7)

wherein R is defined as above, excluding unsaturated compounds, $R^3$ is the same as R excluding unsaturated compounds and with the addition of hydrogen, n varies from 1 to about 1000, and p varies from 5 to about 200. More preferably, n varies from 10 to about 500 and p varies from 5 to about 200.

The hydrogen containing organopolysiloxane, (D), is utilized at a concentration of anywhere from about 0.5 to 25 part by weight per 100 parts by weight (A), and preferably at a concentration of from about 0.5 to about 10 parts by weight per 100 parts by weight (A). It is desirable that in the SiH material there is at least one hydrogen atom for every vinyl group in (A) and preferably from about 1.1 to about 2.5 hydrogen atoms for every vinyl group.

Many types of platinum catalysts for this SiH olefin addition reaction are known and such platinum catalysts may be used for the reaction in the present instance. When optical clarity is required the preferred platinum catalysts are those platinum compound catalysts that are soluble in the reaction mixture. The platinum compound can be selected from those having the formula ($PtCl_2$Olefin) and H($PtCl_3$Olefin) as described in U.S. Pat. No. 3,159,601, hereby incorporated by reference. The olefin shown in the previous two formulas can be almost any type of olefin but is preferably an alkenylene having from 2 to 8 carbon atoms, a cycloalkenylene have from 5 to 7 carbon atoms or styrene. Specific olefins utilizable in the above formulas are ethylene, propylene, the various isomers of butylene, octylene, cyclopentene, cyclohexene, cycloheptene, and the like.

A further platinum containing material usable in the compositions of the present invention is the cyclopropane complex of platinum chloride described in U.S. Pat. No. 3,159,662 hereby incorporated by reference.

Further the platinum containing material can be a complex formed from chloroplatininc acid with up to 2 moles per gram of platinum of a member selected from the class consisting of alcohols, ethers, aldehydes and mixtures of the above as described in U.S. Pat. No. 3,220,972 hereby incorporated by reference.

The catalyst preferred for use with liquid injection molding compositions are described in U.S. Pat. Nos. 3,715,334; 3,775,452; and 3,814,730 to Karstedt. Additional background concerning the art may be found at J. L. Spier, "Homogeneous Catalysis of Hydrosilation by Transition Metals, in *Advances in Organometallic Chemistry*, volume 17, pages 407 through 447, F. G. A. Stone and R. West editors, published by the Academic Press (New York, 1979). Persons skilled in the art can easily determine an effective amount of platinum catalyst. Generally, an effective amount ranges from about 0.1 to 50 parts per million of the total organopolysiloxane composition.

In order to obtain high tensile strength in the compositions of the present invention, it is desirable to incorporate a filler, (B), into the composition. Examples of the many fillers that may be chosen are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers, and the like.

The preferred fillers that should be utilized in the composition of the present invention are either a fumed silica or a precipitated silica that may have been surface treated. In one method of surface treatment, the fumed silica or precipitated silica is exposed to cyclic organopolysiloxanes under heat and pressure. An additional method of treating fillers is one in which the silica is exposed to siloxanes or silanes in the presence of an amine compound.

A particularly preferred method of surface treating silica fillers employs methyl silane silazane surface treating agents. Methylsilane or silazane surface treated fumed or precipitated silica fillers exhibit the property of flowing easily and also do not significantly increase the low viscosity of the uncured liquid precursor silicone composition. After curing, silazane treated silicas impart an improved tear strength to the cured elastomer. Combining the silazane treatment with component (A) for in situ treating seems to give the greatest improvement in physical properties. Silazanes treatments are disclosed in U.S. Pat. Nos. 3,635,743 and 3,847,848 hereby incorporated by reference.

The filler, (B), is generally utilized in a concentration of from about 5 to about 70 parts, preferably 15 to 50 parts filler for each 100 parts by weight of (A). The preferred filler is in situ silazane treated fumed silica or mixtures of silazane treated fumed silica with silazane treated precipitated silica. This latter mixture is particularly preferred containing a weight ratio of fumed silica to precipitated silica of about 25/1 to about 1/1 and preferably from about 10/1 to about 5/1.

Hydroxy containing organopolysiloxane fluid or resin, (E), may be added to improve the mold release properties and to extend the shelf life of the liquid injection molding organopolysiloxane composition. Where silazane treated precipitated silica filler is present in the composition, the hydroxy containing organopolysiloxane fluid or resin may be added in conjunction with the precipitated silica filler to obtain extended shelf life and mold release. Suitable hydroxy containing organopolysiloxane fluids have a viscosity of from about 5 to about 100 centipoise at 25° C. and preferably from about 20 to 50 centipoise. These fluids or resins may be represented by the formula:

$R_q(OH)_rSiO_{(4-q-r)/2}$  (6)

where R is defined as above, q may range from 0 to about 3, preferably 0.5 to about 2.0, r ranges from 0.005 to about 2, and the sum of q and r ranges from about 0.8 to about 3.0. The hydroxy substitution on the organopolysiloxane fluid or resin is primarily a terminal hydroxy substitution. Suitable hydroxy containing organopolysiloxane resins have a viscosity of from about 100 to about 15,000 centipoise at 25° C. and preferably from about 1,000 to 8,000 centipoise.

Components (A), (B), (E), and additives are divided between both compositions that are mixed to form the liquid injection molding composition. Premature reactions are avoided in this manner during storage and transport. When it is desired to form the cured silicone rubber composition, the two components are mixed into each other and the composition is allowed to cure. A fairly general practice is to formulate inhibitors such that the cure rates will allow storage of the resin within a liquid injection molding apparatus over short periods of time such as a weekend without the curable composition curing during storage.

Traditionally liquid injection molding systems have two compositions, a first composition that contains a platinum containing catalyst, and a second composition that contains a hydride and an inhibitor. The two compositions are mixed in a static mixer just prior to use in injection molding. Injection molding cavity temperatures are typically 300° F. or more. The primary function of the liquid injection molding inhibitor is to prevent curing of the molding composition until the mold is filled and thereafter, the mold being filled, to allow a rapid cure to ensure short cycle times. The two compositions may be injected molded directly or dissolved in solvents for application as a film or coating.

In injection molding, the mixing barrel and shot chamber must be cool in order to prevent premature cure. The mold temperature generally varies from about 150° F. to about 500° F. Pigments, thixotropic agents, thermal stabilizers, and the like may be added according to the teachings in the art. It is particularly desirable to add inhibitors in order to obtain a reasonable work life in the catalyzed material. Suitable inhibitors are taught in U.S. Pat. No. 4,256,870 hereby incorporated by reference. One of the most significant problems present in the existing art is the limitation on article size and weight imposed by the kinetics of the catalyzation and the thermochemistry of the injection molding process. These two parameters presently interact to limit the size of liquid injection molded silicone rubber articles of manufacture.

U.S. Pat. No. 3,445,420, the teachings of which are hereby incorporated by reference, discloses and claims curable compositions comprising organopolysiloxanes and acetylenic compounds having a boiling point of at least 25° C. where the acetylenic compound has at least one acetylenic moiety contained within the structural framework of the molecule. Although the use of the acetylenic compounds disclosed and claimed in the '420 patent is well-known in the art, practice of the invention represented by the '420 patent and related inventions has not enabled the liquid injection molding of larger molded articles as contrasted with the present invention.

The liquid injection molding compositions used in conjunction with the low compression set additive compounds of the present invention are thus:

1) from 35 to 75 parts by weight of a vinyl stopped polydimethylsiloxane, A(1), having a viscosity ranging anywhere from 10,000 to 100,000 centipoise and a vinyl content ranging approximately from 0.05 to 0.15 weight per cent;
2) up to 10 parts by weight of a low molecular weight vinyl stopped vinyl on chain polyorganosiloxane, A(2), having a viscosity ranging from 50 to 5,000 centipoise and a vinyl content of approximately 1.5 weight per cent;
3) up to 10 parts by weight of a mono-vinyl stopped polyorganosiloxane, A(3), having a viscosity ranging anywhere from 50 to 10,000 centipoise;
4) from 5 to 30 parts by weight of a fumed or pyrogenic silica filler (B), having a surface area ranging from 150 to 450 $m^2/gm$;
5) from 2 to 50 wppm of a Pt hydrosilylation catalyst, (C);
6) from 0.01 to 0.50 parts by weight of an inhibitor compound, (F); and
7) from 100 to 500 wppm of silyl hydrides, (D);
8) an additional amount, if necessary, of a silyl hydride whereby the hydride groups are present at least in molar equivalence to the total quantity of olefinic unsaturation present; and
9) from 0.1 to 6.0 parts by weight of a mold release agent, typically a silanol fluid being a hydroxy stopped polydiorganosiloxane having a silanol content of from about 2 weight per cent to about 11 weight percent silanol and a viscosity of about 5 to about 100 centipoise or a silanol containing resin having a silanol content of from about 1 weight percent to about 5 weight percent silanol and a viscosity of about 100 to about 15,000 centipoise and
10) from about 1 part per million by weight to about 10,000 parts per million by weight, preferably from about 5 parts per million by weight to about 5,000 parts per million by weight, more preferably from about 10 parts per million by weight to about 1,000 parts per million by weight, and most preferably from about 20 parts per million by weight to about 600 parts per million by weight of the low compression set additive compounds of the present invention.

While an examination of chemical stoichiometry would indicate that a one to one molar basis between the alkenyl group and the hydride groups would establish the necessary one to one equivalence for cross linking, because of diffusion limitations and the fact that a cross linking reaction is occurring which further decreases diffusion, a molar excess of hydride to alkenyl will tend to improve the physical properties of a given formulation relative to those formulations where the two reactants are present in strict molar equivalence. This molar excess ranges from about 20 to 40%, preferably from 25 to 35%, and most preferably a 30% molar excess of hydride over alkenyl in the liquid injection molding composition.

While the addition of the high alkenyl content resins that may be utilized in the present invention for a liquid injection molding formulation will improve certain physical properties such as Durometer, given a standard quantity of a liquid injection molding base formulation, the addition of progressively larger quantities of the high alkenyl resin, or mixtures thereof, will progressively improve those properties. Accompanying this increase in high alkenyl content resin added to the liquid injection molding formulation to achieve this controllable improvement in physical properties, there should also be a proportional increase in the amount of hydride containing materials added to the liquid injection molding formulation, in order to maintain the desired 1 to 1.6 molar ratio of silyl hydride species to alkenyl species.

When using liquid injection molding compositions, the process and compositions of the present invention allows for a reduction in compression set without affecting the peak cure rate. A peak cure rate that is unaffected by the low compression set additive is defined to be a peak cure rate that is no less than about 80% of the base peak rate and no more than about 120% of the base peak rate, where the base peak rate is defined to be the peak rate measured for a liquid injection molding composition where the low compression set additives of the present invention are absent. Thus a peak cure rate varying as about plus or minus 20% is an unaffected peak cure rate.

The heat curable or high consistency millable rubber compositions that benefit from the low compression set additive compound of the present invention comprise:

(1) an alkenyl silicone gum or mixture of alkenyl silicone gums selected from the group of alkenyl silicone gums having the formula:

$$(M'_\alpha M^{vi'}{}_{1-\alpha})(D^{vi'})_x(D')_y(M'_\alpha M^{vi'}{}_{1-\alpha})$$

where $\alpha$ is zero or one and x and y are zero or integers whereby the sum of x+y yields a gum having a viscosity ranging from about 200,000 to about 200,000,000 centipoise at 25° C. and whereby the sum of ($\alpha$+x+y) yields a gum having an alkenyl content ranging from about 0.02 to about 14.00 weight percent, subject to the limitation that x must be greater than zero when a is one, where $M'=R^{1'}{}_3SiO_{1/2}$ with $R^{1'}$ selected from the group consisting of 1 to 8 carbon atom alkyl groups, phenyl, and trifluoropropyl;

$M^{vi'}=R^{2'}(R^{1'})_2SiO_{1/2}$ with $R^{1'}$ selected from the group consisting of 1 to 8 carbon atom alkyl groups, phenyl, and trifluoropropyl and $R^{2'}$ selected from the group of 2 to 10 carbon atom linear or cyclic alkenyl groups;

$D^{vi'}=R^{2'}(R^{1'})SiO_{2/2}$ where $R^{1'}$ and $R^{2'}$ are as previously defined;

$D'=(R^{3'})_2SiO_{2/2}$ where each $R^{3'}$ is independently selected from the group consisting of 1 to 8 carbon atom alkyl groups, phenyl, and trifluoropropyl; and (2) a noble metal type catalyst curing agent.

When a mixture of gums is used, a preferred mixture comprises at least three gums defined by the formulas:

$$M^{vi'}D^{vi'}D'M^{vi'};\qquad(1)$$

$$M^{vi'}D'M^{vi'};\qquad(2)$$

and $$M'D^{vi'}M'.\qquad(3)$$

The gums of the present invention are amenable to incorporating various additives, fillers, extenders and diluents. For example when a diluent gum is used in conjunction with the alkenyl silicones of the present invention, a gum having the formula:

$$M'D'M',$$

and having a viscosity ranging from 200,000 to 200,000,000 centipoise at 25° C. is particularly preferred.

A particularly useful specific embodiment of the present invention comprises:

(a) from about 5 parts by weight to about 100 parts by weight of a vinyl on chain vinyl stopped gum having the formula:

$$M^{vi'}D^{vi'}{}_xD'_yM^{vi'}$$

where x and y are different integers greater than zero and the sum of x and y have values whereby the viscosity of (a) is between 200,000 and 200,000,000 cps and the alkenyl level varies from about 0.02 weight percent to about 14.00 weight percent;

(b) from about 0.2 parts by weight to about 95 parts by weight of a vinyl stopped gum having the following formula:

$$M^{vi'}D'_zM^{vi'}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$M'D^{vi'}{}_qM'$$

where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$$M'D'_wM'$$

where w is an integer greater than zero whereby the viscosity of (d) is between 200,000 and 200,000,000 cps;

whereby the quantities present of the components (a), (b), (c), and (d) (of the heat curable high consistency millable or addition cured rubber add to 100 parts by weight;

(e) from about 0.1 parts by weight to about 5 parts by weight of an MQ resin, as a mold release agent, having a viscosity between 100 and 15,000 centipoise, where the M:Q ratio between about 0.8:1.0 and about 3.0:1.0; or from about 0.1 parts by weight to about 5 parts by weight of a hydroxy containing organopolysiloxane fluid having a viscosity ranging from about 5 to about 100 centipoise at 25° C.;

whereby the quantities present of the components (a), (b), (c), (d), and (e) add to between about 100.1 parts by weight to about 105 parts by weight;

(f) from about 15 to about 80 parts by weight of a fumed silica filler, having a surface area of 50–400 m²/g before any treatment, functioning as a reinforcing filler; whereby the quantities present of the components (a), (b), (c), (d), (e) and (f) add to between 115.1 parts by weight and 185 parts by weight wherein the fumed silica filler may be treated with octamethylcyclotetrasiloxane or octamethylcyclotetrasiloxane and hexamethyldisilazane or in situ treated with hexamethyldisilazane and tetramethyldivinyldisilazane;

(g) from about 0.0001 to about 1.5 parts by weight of a noble metal type catalyst curing agent;

whereby the quantities present of the components (a), (b), (c), (d), (e), (f) and (g) add to between 115.11 parts by weight and 186.5 parts by weight; where:

$M'=R^{1'}{}_3SiO_{1/2}$ with $R^{1'}$ selected from the group consisting of 1 to 8 carbon atom alkyl groups, phenyl, and trifluoropropyl;

$M^{vi'}=R^{2'}(R^{1'})_2SiO_{1/2}$ with $R^{1'}$ selected from the group consisting of 1 to 8 carbon atom alkyl groups, phenyl, and trifluoropropyl and $R^{2'}$ selected from the group of 2 to 10 carbon atom linear or cyclic alkenyl groups;

$D^{vi'}=R^{2'}(R^{1'})SiO_{2/2}$ where $R^{1'}$ and $R^{2'}$ are as previously defined;

D'=(R³)₂SiO_{2/2} where each R³' is independently selected from the group consisting of 1 to 8 carbon atom alkyl groups, phenyl, and trifluoropropyl; and Q=SiO_{4/2};

(h) from about 1 to about 15 parts by weight per hundred parts by weight of the sum of (a), (b), (c), (d), (e), (f) and (g) of an organohydrogen siloxane cross linking agent having the formula:

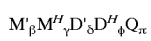

with M' and D' as previously defined and $M^H = H(R^{1'})_2 SiO_{1/2}$ with $R^{1'}$ selected from the group consisting of 1 to 8 carbon atom alkyl groups, phenyl, and trifluoropropyl and with $D^{H=H(R1')}SiO_{2/2}$ where $R^{1'}$ is as previously defined where the value of the subscript π, is 0 or 1; wherein when π is 0 the value of the subscripts δ and φ independently range from 1 to about 60 and β and γ range from zero to two subject to the limitation that the sum of β and γ is two; and wherein when π is 1 the value of the subscripts δ and δ is zero and β and γ independently range from zero to four subject to the limitation that the sum of β and γ ranges from one to four, wherein the viscosity of the hydrogen containing organopolysiloxane ranges from about 5 to about 500 centipoise at 25° C.; and (i) from about 0.01 to 0.5 parts by weight per hundred parts by weight of the sum of (a), (b), (c), (d), (e), (f), and (g) of an inhibitor compound, such as taught in U.S. Pat. Nos. 3,445,420 or 4,256,870, or 5,506,289 and (j) from about 1 part per million by weight to about 10,000 parts per million by weight per hundred parts by weight of the sum of (a), (b), (c), (d), (e), (f), and (g), preferably from about 5 parts per million by weight to about 5,000 parts per million by weight per hundred parts by weight of the sum of (a), (b), (c), (d), (e), (f), and (g), more preferably from about 10 parts per million by weight to about 1,000 parts per million by weight per hundred parts by weight of the sum of (a), (b), (c), (d), (e), (f, and (g), and most preferably from about 20 parts per million by weight to about 600 parts per million by weight per hundred parts by weight of the sum of (a), (b), (c), (d), (e), (f), and (g) of the low compression set additive compounds of the present invention.

The curable rubbers of the present invention may be made by a cold mixing process comprising the steps of:

(a) mixing the curable components; and
(b) controlling the temperature of the mixing whereby the temperature of the mixture does not exceed 100° C., preferably 90° C., more preferably 80° C. and most preferably 65° C. during the process of mixing.

Further, the heat cured rubbers and articles of manufacture made from the composition of the present invention exhibit improved compression set and may have markedly improved heat age properties. The heat cured rubbers made with the composition of the present invention are useful for gaskets, bushings, o-rings, tubing, medical tubing, gas masks, catheters, windshield wiper blades, spatula blades, automobile radiator hoses, spark plug boots, keyboard keypads, baby bottle nipples, electrical connectors, grommets, seals, diving masks, snorkels, earplugs, mouthguards, and foamed heat cured rubber products.

In the components of the present invention, applicants define the following structures:

$M' = R^{1'}_3 SiO_{1/2}$ where $R^{1'}$ is selected from the group consisting of 1 to 8 carbon atom alkyl groups, phenyl, and trifluoropropyl;

$M^{vi'} = R^{2'}(R^{1'})_2 SiO_{1/2}$ where $R^{1'}$ is selected from the group consisting of 1 to 8 carbon atom alkyl groups, phenyl, and trifluoropropyl and $R^{2'}$ is selected from the group of 2 to 10 carbon atom linear or cyclic alkenyl groups;

$D^{vi'}_x = R^{2'}(R^{1'})SiO_{2/2}$ where the R groups are as previously defined;

$D' = (R^{3'})_2 SiO_{2/2}$ where each $R^{3'}$ group is independently selected from the group consisting of 1 to 8 carbon atom alkyl groups, phenyl, and trifluoropropyl; and $Q = SiO_{4/2}$. All of the gum components utilized by the present invention have a viscosity ranging from 200,000 to 200,000,000 centipoise at 25° C.

The amounts of the above components may be varied in a wide ranging fashion to produce rubbers of the present invention. Each of the components of the present invention are present in amounts as follows:

| Component | Lower Limit parts by weight | Upper Limit parts by weight |
|---|---|---|
| (a) | 5 | 100 |
| (b) | 0.2 | 95 |
| (c) | 0.2 | 75 |
| (d) | 0 | 30 |
| (e) | 0.1 | 5 |
| (f) | 15 | 80 |
| (g) | 0.0001 | 1.5 |
| (h) | 1 pph* | 15 pph* |
| (i) | 0.0001 pph* | 1.0 pph* |
| (j) | 0.01 pph* | 0.5 pph* |
| Extending fillers | 0 | 80 |
| Other Additives | 0 | 10; where pph* | means parts per hundred parts by weight of the sum of (a), (b), (c), (d), (e), (f), and (g).

The first four components (a)+(b)+(c)+(d) must sum to 100 parts by weight and the total alkenyl level of the mixture of the four component gums (a), (b), (c), and (d) ranges between 0.01 weight percent and about 3.00 weight percent.

Applicants note that it is a standard chemical shorthand in the field of silicone chemistry to refer to various fluids, resins and gums by such general designations as MDM for an M-stopped polydiorganosiloxane where the degree of polymerization of the repeating D units is unspecified except as to viscosity of the resulting polymer. Thus more particularly, $MD_xM$, where x is a stoichiometric coefficient indicating a degree of polymerization would vary and low values of x produce pourable fluids, intermediate values of x produce more viscous fluids, and high values produce gums and that as x increases so does viscosity. Thus in terms of notation and equivalence, $MD^{vi}DM$ is exemplary of a chemical shorthand where the structure of the polymer more properly possesses stoichiometric subscripts, i.e. $MD^{vi}_xD_yM$, and these relate directly to degree of polymerization and viscosity. By stipulating a viscosity for a given polymeric silicone, these stoichiometric subscripts are defined, even if their presence must be inferred from the chemical shorthand used.

The heat curable high consistency rubber formulations suitable for use with the compounds of the present invention use a noble metal hydrosilylation catalyst similar to those used for liquid injection molding and discussed previously.

Various forms of untreated and treated pyrogenic or fumed silica fillers have been employed. Frequently the treatments of choice involve treating with low molecular weight cyclic oligomeric silicones such as octamethylcyclotetrasiloxane or silazane species such as hexamethyldisilazane. The art of such treated fillers has even involved double treating of such materials, first with a silazane followed by a finishing treatment with a low molecular weight cyclic oligomer or vice versa. Usually these treatments are conducted in situ and on an ad hoc basis. Frequently, the techniques have been such that process aids are selected for their ability to fulfill a dual function, that is to reduce the viscosity of the gum blend and treat the surface of the fumed silica reinforcing filler, simultaneously.

The essential components of the heat curable rubbers of the present invention are the vinyl silicone gums which may be any of (a), (b), or (c); the mold release agent, the catalyst curing agent, the reinforcing fumed or pyrogenic silica filler, the hydride crosslinking compound, and the inhibitor compound. To this mixture may be added extending fillers such as precipitated silica, finely divided quartz, mica, alumina, titania, and the like. Additionally, additive materials which impart specific performance features the finished cured rubber composition may also be incorporated such as zinc oxide, magnesium oxide, copper oxide, ferrous oxide, ferric oxide, aluminum oxide, titanium dioxide, ceric oxide, ceric hydroxide, and the various metal salts of long chain fatty acids such as the metal octoates.

These platinum catalyzed millable rubber formulations are usually two component systems that can be formulated in a number of different ways. Using the shorthand above for the constituents, two examples of the different formulations possible are:

First Example

| Component | A (50 parts by weight) | Component | B (50 parts by weight) |
| --- | --- | --- | --- |
| Gums | a, b, c, d | Gums | a, b, c, d |
| Filler | f | Filler | f |
| Mold Release Agent | e | Mold Release Agent | e |
| Platinum Catalyst | g | Hydride Crosslinker | h |
| Low Compression Set Additive | j | Inhibitor | i | or
Second Example

| Component | A (99 parts by weight) | Component | B (1 parts by weight) |
| --- | --- | --- | --- |
| Gums | a, b, c, d | Gums | a, b, c, d |
| Filler | f | Platinum Catalyst | g |
| Mold Release Agent | e | Inhibitor | i |
| Hydride Crosslinker | h | | |
| Low Compression Set Additive | j | | |

These two examples demonstrate that millable rubber formulations do not necessarily consist of equal amounts of the two components mixed together to prepare the rubber.

The heat curable rubbers useful with the compounds of the present invention may have improved compression set, may have improved oil resistance, and may have improved compression stress relaxation, i.e. sealing force retention.

Frequently it is desirable to have a formulation that will bond to other materials. Thus liquid injection moldable silicone compositions or millable heat curable rubber compositions may contain an additive that increases adhesion of the material to various substrates. The substrates that these materials may be bonded to include thermosetting polymers and thermoplastic polymers. Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenol-formaldehyde resins, including Novolacs and resols; and thermosetting polyesters, silicones, and urethanes. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(epsilon-caprolactam), poly(hexamethylene adipamide), poly(hexamethylene sebacamide), poly(11-amino-undecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly (sulfonyl-1,4-phenyleneoxy1,4-phenylenesulfonyl-4,4'-biphenylene), and the like; polycarbonates, such as poly (bisphenolA)or poly(carbonyldioxy-1,4-phenyleneisopropylidene-1,4-phenylene), and the like; polyesters, such as poly(ethylene terephthalate), poly (tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly (thio-1,4-phenylene), and the like; polyimides, such as poly (pyromellitimido- 1,4-phenylene), and the like; polyolefins, such as polyethylene, polypropylene, poly(1-butene), poly (2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly (vinylidene chloride), polystyrene, and the like: copolymers of the foregoing, such as acrylonitrile-butadiene-styrene (ABS) copolymers, and the like; and the like.

In the case of liquid injection moldable compositions, a molded part can be part of the mold into which the liquid composition is injected and the additive imparts adhesion to surfaces where bonding is desired. This can occur whether the part is molded ex situ, i.e. outside of the mold where the liquid injection moldable silicone composition will be molded, or whether the part is mold in the mold where the liquid injection moldable silicone composition will be molded, i.e. co-injection. For the compositions of the present invention a two-part self-bonding adhesion promoter system appears to work best. This two part system is composed of a silanol terminated linear silicone which may have vinyl on chain and bis(trimethoxysilylpropyl)fumarate, which has the formula:

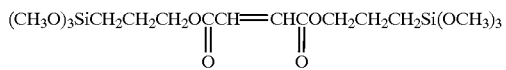

and is the trans isomer (the trans isomers are fumarates and cis isomers are maleates).

The formula of the silanol terminated polymer that may have vinyl on chain is:

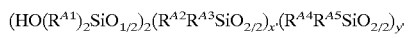

where each of $R^{A1}$, $R^{A2}$, $R^{A3}$, and $R^{A4}$, is independently a one to forty carbon atom monovalent organic radical and $R^{A5}$ is a two to forty carbon atom monovalent olefinic organic radical where the subscript y' may range from 0 to about 50 and the subscript x' may range from 0 or 1 to about 100 and when alkenyl groups are present, i.e. y' is non-zero, a weight percent vinyl content ranging from about 0.10 weight percent to about 25.00 weight percent.

The silanol stopped silicone component is used in the liquid injection molding formulation at a level ranging from about 0.10 weight percent to about 5.00 weight percent, preferably from about 0.15 weight percent to about 2.00 weight percent, more preferably from about 0.20 weight percent to about 2.00 weight percent, and most preferably from about 0.25 weight percent to about 1.00 weight percent based on the total weight of the composition. The bis (trimethoxysilylpropyl)fumarate component is used in the liquid injection molding formulation at a level ranging from about 0.10 weight percent to about 5.00 weight percent, preferably from about 0.15 weight percent to about 2.00 weight percent, more preferably from about 0.20 weight percent to about 2.00 weight percent, and most preferably from about 0.25 weight percent to about 1.00 weight percent based on the total weight of the composition. When this adhesion promoter system is used in millable heat curable rubber formulations, the weight ranges will vary from those ideal for liquid injection molding silicone compositions.

Applicants note that the phrase "one to forty carbon atom monovalent organic radicals" recited earlier in the instant application includes compositions and ions specifically exemplified by, but not limited to the following: $CH_3CH(R^{N1}_aR^{N2}_bR^{N3}_cN^+)CO_2H$, $CH_2(R^{N1}_aR^{N2}_bR^{N3}_cN^+)CO_2H$ etc., i.e. the ammonium cations of amino acids where $R^{N1}$ $R^{N2}$, and $R^{N3}$ are as previously defined or alternatively, the Zwitterionic forms of the amino acids, the amino acids thereof themselves and the ammonium cations of amino acid esters and amides. Any cationic nitrogen compound with the exception of simple ammonium ion salts, i.e. salts of $NH_4^+$, is envisioned by the Applicants as a low compression set additive compound of the present invention.

All of the U.S. patents referenced herein are herewith specifically incorporated by reference.

Experimental

Cure performance was evaluated on a Monsanto MDR (Modulating Disk Rheometer) 2000 rheometer. Such testing is conducted as follows: an uncured liquid injection molding sample is placed in the sample chamber which is maintained at the desired cure temperature. The clamps then close and the top plate starts oscillating. As the material solidifies over time, the torque (S') increases until full cure is achieved. The most important data obtained in these runs for the purposes of illustrating the present invention are as follows:

1) the maximum S' value is related to the physical properties of the cured material;
2) integration of the torque curve allows the determination of cure level vs. time; the times at 2% and 90% of reaction extent (T02 and T90, respectively) are particularly significant as they provide information as to when the cure reaction starts and finishes; and
3) the peak rate value can be used to evaluate the speed or velocity of cure once it begins. The peak rate value is the change in torque with time at elevated temperature, and can be used to evaluate the speed or velocity of the cure once curing begins.

For a liquid injection molding composition to be useful in large part formulation and molding, there should be a significant and observable difference in cure times at 250° F. and 350° F. Cure should be slow at 250° F. to allow for mold filling and very fast at 350° F. in order to accommodate short cycle times.

STANDARD COMPRESSION SET TEST

The standard compression set test used throughout these experiments, as detailed in ASTM D395, entails molding liquid injection molding silicone elastomer plugs 1" in diameter by ½" thick and compressing them in a jig to 75% of their original thickness or by using plies which are stacks of ⅛" sheets in laminar form to obtain the required ½" thickness and heating in an air circulating oven for 22 hrs. at 177° C. When the heating cycle is complete, the jig containing the sample is removed from the oven and the plugs contained within are also removed and permitted to "relax" while cooling in an uncompressed state. Once the plugs have reached an equilibrium with standard room temperature (25° C.) and have remained there for several hours, the degree of compression set is measured by comparing the thickness of the plugs to the original, un-compressed, thickness. A typical calculation for compression set is given below:

Percent compression set=C=[(Yo−Yl)/(Yo−Ys)]* 100 where Yo=initial thickness, Yl=final thickness, and Ys=75% of initial thickness

TABLE 1

Cure Profile Determination of a Standard Liquid Injection Molding Formulation by Modulating Disk Rheometer and Physical Properties - Control - No Low Compression Set Additive

| Experiment | 1 |
|---|---|
| Amount of Additive | none |
| MDR at 250° F. | |
| T02, seconds | 68 |
| T90, seconds | 126 |
| Max. Torque, inch-lbs. | 18.54 |
| Peak Rate, inch-lbs./min. | 55.2 |
| MDR at 350° F. | |
| T02, seconds | 04 |
| T90, seconds | 15 |
| Max. Torque, inch-lbs. | 18.72 |
| Peak Rate, inch-lbs./min. | 163.5 |
| Physical Properties | |
| Shore A | 50.7 |
| Tensile, psi | 1173 |
| % Elongation | 470 |

TABLE 1-continued

Cure Profile Determination of a Standard Liquid Injection Molding Formulation by Modulating Disk Rheometer and Physical Properties - Control - No Low Compression Set Additive

| Experiment | 1 |
|---|---|
| 100% Modulus, psi | 296 |
| Tear (die B), ppi | 230 |
| Compression Set, percent; 22 hours at 177° C. | 46 |

TABLE 2

Cure Profile Determination of a Standard Liquid Injection Molding Formulation by Modulating Disk Rheometer and Physical Properties - 20 wt. % KOH in Methanol

| Experiment | 1 | 2 | 3 | 4 | 5 |
|---|---|---|---|---|---|
| Amount of Additive | 100 | 200 | 300 | 400 | 500 |
| MDR at 250° F. | | | | | |
| T02, seconds | 8.8 | 15 | 75 | 66 | 71 |
| T90, seconds | 143 | 70 | 120 | 122 | 132 |
| Max. Torque, inch-lbs. | 19.59 | 14.14 | 19.29 | 19.46 | 19.30 |
| Peak Rate, inch-lbs./min. | 59.3 | 30.2 | 58.6 | 40.4 | 56.3 |
| MDR at 350° F. | | | | | |
| T02, seconds | 04 | 04 | 05 | 04 | 04 |
| T90, seconds | 15 | 14 | 14 | 14 | 14 |
| Max. Torque, inch-lbs. | 20.54 | 20.46 | 20.14 | 19.79 | 19.49 |
| Peak Rate, inch-lbs./min. | 181.2 | 183.4 | 180.5 | 179.7 | 176.9 |
| Physical Properties | | | | | |
| Shore A | 52.6 | 52.0 | 52.9 | 53.0 | 52.8 |
| Tensile, psi | 1212 | 1244 | 1275 | 1134 | 1089 |
| % Elongation | 503 | 478 | 495 | 437 | 421 |
| 100% Modulus, psi | 316 | 318 | 321 | 313 | 321 |
| Tear (die B), ppi | 232 | 204 | 223 | 224 | 227 |
| Compression Set, percent; 22 hours at 177° C. | 55.3 | 55.7 | 55.3 | 56.6 | 51.7 |

TABLE 3

Cure Profile Determination of a Standard Liquid Injection Molding Formulation by Modulating Disk Rheometer and Physical Properties - Potassium Silanolate

| Experiment | 1 | 2 | 3 | 4 | 5 |
|---|---|---|---|---|---|
| Amount of Additive | 100 | 200 | 300 | 400 | 500 |
| MDR at 250° F. | | | | | |
| T02, seconds | 47 | 72 | 69 | 49 | 67 |
| T90, seconds | 98 | 123 | 130 | 111 | 140 |
| Max. Torque, inch-lbs. | 18.54 | 19.96 | 18.83 | 18.73 | 18.75 |
| Peak Rate, inch-lbs./min. | 65.4 | 49.5 | 61.1 | 36.4 | 59.0 |
| MDR at 350° F. | | | | | |
| T02, seconds | 03 | 04 | 05 | 05 | 04 |
| T90, seconds | 12 | 13 | 15 | 14 | 14 |
| Max. Torque, inch-lbs. | 18.65 | 18.31 | 19.14 | 18.86 | 18.18 |
| Peak Rate, inch-lbs./min. | 182.6 | 173.7 | 169.2 | 168.7 | 166.7 |
| Physical Properties | | | | | |
| Shore A | 52.9 | 52.8 | 52.3 | 52.4 | 51.4 |
| Tensile, psi | 1154 | 1119 | 1147 | 1074 | 1074 |
| % Elongation | 446 | 432 | 444 | 417 | 424 |
| 100% Modulus, psi | 327 | 317 | 319 | 315 | 304 |

TABLE 3-continued

Cure Profile Determination of a Standard Liquid Injection Molding Formulation by Modulating Disk Rheometer and Physical Properties - Potassium Silanolate

| Experiment | 1 | 2 | 3 | 4 | 5 |
|---|---|---|---|---|---|
| Tear (die B), ppi | 224 | 231 | 210 | 235 | 233 |
| Compression Set, percent; 22 hours at 177° C. | 47.7 | 50.2 | 50.0 | 50.2 | 65.5 |

TABLE 4

Cure Profile Determination of a Standard Liquid Injection Molding Formulation by Modulating Disk Rheometer and Physical Properties - 20 wt. % Tetramethylammonium Hydroxide in Methanol

| Experiment | 1 | 2 | 3 | 4 | 5 |
|---|---|---|---|---|---|
| Amount of Additive | 100 | 200 | 300 | 400 | 500 |
| MDR at 250° F. | | | | | |
| T02, seconds | 74 | 70 | 70 | 70 | 94 |
| T90, seconds | 122 | 127 | 121 | 121 | 155 |
| Max. Torque, inch-lbs. | 18.61 | 18.73 | 18.06 | 18.01 | 18.33 |
| Peak Rate, inch-lbs./min. | 61.2 | 54.9 | 49.1 | 43.7 | 43.3 |
| MDR at 350° F. | | | | | |
| T02, seconds | 04 | 04 | 04 | 03 | 04 |
| T90, seconds | 15 | 14 | 14 | 14 | 17 |
| Max. Torque, inch-lbs. | 19.93 | 19.78 | 17.83 | 17.90 | 19.82 |
| Peak Rate, inch-lbs./min. | 167.8 | 174.5 | 158.1 | 158.6 | 153.5 |
| Physical Properties | | | | | |
| Shore A | 52.8 | 52.3 | 52.4 | 52.5 | 51.2 |
| Tensile, psi | 1207 | 1228 | 1190 | 1155 | 1079 |
| % Elongation | 463 | 472 | 452 | 446 | 425 |
| 100% Modulus, psi | 332 | 324 | 325 | 324 | 304 |
| Tear (die B), ppi | 260 | 230 | 219 | 233 | 205 |
| Compression Set, percent; 22 hours at 177° C. | 42.3 | 30.8 | 20.9 | 19.0 | 18.9 |

TABLE 5

Cure Profile Determination of a Standard Liquid Injection Molding Formulation by Modulating Disk Rheometer and Physical Properties - 20 wt. % Hexamethylguanidinium Bromide in Methanol

| Experiment | 1 | 2 | 3 |
|---|---|---|---|
| Amount of Additive | 50 | 100 | 200 |
| MDR at 250° F. | | | |
| T02, seconds | 60 | 122 | |
| T90, seconds | 139 | 332 | |
| Max. Torque, inch-lbs. | 18.07 | 11.32 | |
| Peak Rate, inch-lbs./min. | 37.1 | 3.40 | |
| MDR at 350° F. | | | |
| T02, seconds | 04 | 14 | 54 |
| T90, seconds | 17 | 42 | 189 |
| Max. Torque, inch-lbs. | 20.54 | 19.10 | 17.87 |
| Peak Rate, inch-lbs./min. | 163.5 | 52.0 | 12.6 |
| Physical Properties | | | |
| Shore A | 51.9 | 50.7 | 49.7 |
| Tensile, psi | 1032 | 1054 | 1119 |
| % Elongation | 415 | 442 | 504 |
| 100% Modulus, psi | 314 | 293 | 270 |
| Tear (die B), ppi | 213 | 232 | 203 |
| Compression Set, percent; 22 hours at 177° C. | 18.4 | 12.3 | 12.0 |

TABLE 6

Cure Profile Determination of a Standard Liquid Injection Molding Formulation by Modulating Disk Rheometer and Physical Properties - 20 wt. % Hexamethylguanidinium Tetrafluoroborate in Methanol

| Experiment | 1 | 2 |
|---|---|---|
| Amount of Additive | 200 | 400 |
| MDR at 250° F. | | |
| T02, seconds | 65 | 75 |
| T90, seconds | 129 | 134 |
| Max. Torque, inch-lbs. | 18.22 | 16.19 |
| Peak Rate, inch-lbs./min. | 54.4 | 35.8 |
| MDR at 350° F. | | |
| T02, seconds | 04 | 04 |
| T90, seconds | 14 | 15 |
| Max. Torque, inch-lbs. | 17.76 | 16.98 |
| Peak Rate, inch-lbs./min. | 153.8 | 149.4 |
| Physical Properties | | |
| Shore A | | |
| Tensile, psi | | |
| % Elongation | | |
| 100% Modulus, psi | | |
| Tear (die B), ppi | | |
| Compression Set, percent; 22 hours at 177° C. | 22.3 | 26.6 |

TABLE 7

Cure Profile Determination of a Standard Liquid Injection Molding Formulation by Modulating Disk Rheometer and Physical Properties - 20 wt. % Hexamethylguanidinium Chloride in Methanol

| Experiment | 1 | 2 |
|---|---|---|
| Amount of Additive | 50 | 100 |
| MDR at 250° F. | | |
| T02, seconds | | |
| T90, seconds | | |
| Max. Torque, inch-lbs. | | |
| Peak Rate, inch-lbs./min. | 49.9 | 17.1 |
| MDR at 350° F. | | |
| T02, seconds | 03 | 05 |
| T90, seconds | 14 | 29 |
| Max. Torque, inch-lbs. | 18.56 | 17.05 |
| Peak Rate, inch-lbs./min. | 159.7 | 108.8 |
| Physical Properties | | |
| Shore A | | |
| Tensile, psi | | |
| % Elongation | | |
| 100% Modulus, psi | | |
| Tear (die B), ppi | | |
| Compression Set, percent; 22 hours at 177° C. | 38.0 | 21.4 |

TABLE 8

Cure Profile Determination of a Standard Liquid Injection Molding Formulation by Modulating Disk Rheometer and Physical Properties - 20 wt. % Tetrabutylammonium Hydroxide in Methanol

| Experiment | 1 | 2 |
|---|---|---|
| Amount of Additive | 200 | 400 |
| MDR at 250° F. | | |
| T02, seconds | | |
| T90, seconds | | |
| Max. Torque, inch-lbs. | | |
| Peak Rate, inch-lbs./min. | 27.3 | 14.7 |
| MDR at 350° F. | | |
| T02, seconds | | |
| T90, seconds | | |
| Max. Torque, inch-lbs. | | |
| Peak Rate, inch-lbs./min. | 103.3 | 46.1 |
| Physical Properties | | |
| Shore A | | |
| Tensile, psi | | |
| % Elongation | | |
| 100% Modulus, psi | | |
| Tear (die B), ppi | | |
| Compression Set, percent; 22 hours at 177° C. | 27.5 | 19.3 |

TABLE 9

Cure Profile Determination of a Standard Liquid Injection Molding Formulation by Modulating Disk Rheometer and Physical Properties - 20 wt. % Dodecyltrimethylammonium Bromide in Methanol

| Experiment | 1 | 2 | 3 |
|---|---|---|---|
| Amount of Additive | 50 | 75 | 100 |
| MDR at 250° F. | | | |
| T02, seconds | | 47 | |
| T90, seconds | | 92 | |
| Max. Torque, inch-lbs. | | 14.93 | |
| Peak Rate, inch-lbs./min. | | 38.5 | |
| MDR at 350° F. | | | |
| T02, seconds | | 05 | |
| T90, seconds | | 21 | |
| Max. Torque, inch-lbs. | | 17.33 | |
| Peak Rate, inch-lbs./min. | 139.1 | 134.0 | 130.2 |
| Physical Properties | | | |
| Shore A | | 49.9 | |
| Tensile, psi | | 1130 | |
| % Elongation | | 482 | |
| 100% Modulus, psi | | 296 | |
| Tear (die B), ppi | | 261 | |
| Compression Set, percent; 22 hours at 177° C. | 16.8 | 15.1 | 18.1 |

TABLE 10

Cure Profile Determination of a Standard Liquid Injection Molding Formulation by Modulating Disk Rheometer and Physical Properties - 50 wt. % Dodecyltrimethylammonium Chloride in iso-Propanol

| Experiment | 1 | 2 | 3 | 4 | 5 |
|---|---|---|---|---|---|
| Amount of Additive | 50 | 100 | 200 | 300 | 400 |
| MDR at 250° F. | | | | | |
| T02, seconds | 50 | 41 | 45 | 36 | 37 |
| T90, seconds | 88 | 79 | 79 | 90 | 109 |
| Max. Torque, inch-lbs. | 18.05 | 17.26 | 17.78 | 17.78 | 17.75 |
| Peak Rate, inch-lbs./min. | 65.2 | 53.5 | 66.3 | 46.7 | 29.3 |
| MDR at 350° F. | | | | | |
| T02, seconds | 04 | 03 | 03 | 04 | 05 |

TABLE 10-continued

Cure Profile Determination of a Standard Liquid Injection Molding Formulation by Modulating Disk Rheometer and Physical Properties - 50 wt. % Dodecyltrimethylammonium Chloride in iso-Propanol

| Experiment | 1 | 2 | 3 | 4 | 5 |
|---|---|---|---|---|---|
| T90, seconds | 14 | 13 | 14 | 16 | 17 |
| Max. Torque, inch-lbs. | 19.73 | 19.55 | 18.92 | 18.87 | 18.92 |
| Peak Rate, inch-lbs./min. | 180.5 | 177.1 | 166.4 | 156.7 | 148.0 |
| Physical Properties | | | | | |
| Shore A | 51.2 | 52.2 | 51.3 | 52.4 | 51.9 |
| Tensile, psi | 984 | 1062 | 1031 | 1153 | 1004 |
| % Elongation | 413 | 446 | 433 | 484 | 405 |
| 100% Modulus, psi | 310 | 310 | 308 | 311 | 310 |
| Tear (die B), ppi | 224 | 229 | 237 | 236 | 210 |
| Compression Set, percent; 22 hours at 177° C. | 41.6 | 26.9 | 20.0 | 13.5 | 14.4 |

TABLE 11

Cure Profile Determination of a Standard Liquid Injection Molding Formulation by Modulating Disk Rheometer and Physical Properties - 30 wt. % Ammonium Hydroxide in Water

| Experiment | 1 | 2 | 3 |
|---|---|---|---|
| Amount of Additive | 80 | 200 | 400 |
| MDR at 250° F. | | | |
| T02, seconds | 66 | 52 | 51 |
| T90, seconds | 113 | 90 | 105 |
| Max. Torque, inch-lbs. | 16.64 | 16.15 | 15.93 |
| Peak Rate, inch-lbs./min. | 65.6 | 65.8 | 47.2 |
| MDR at 350° F. | | | |
| T02, seconds | 4 | 4 | 4 |
| T90, seconds | 17 | 14 | 16 |
| Max. Torque, inch-lbs. | 15.91 | 16.73 | 16.35 |
| Peak Rate, inch-lbs./min. | 137.1 | 138.1 | 131.4 |
| Physical Properties | | | |
| Shore A | 50.4 | 50.2 | 48.8 |
| Tensile, psi | 1168 | 1189 | 1111 |
| % Elongation | 454 | 467 | 464 |
| 100% Modulus, psi | 314 | 306 | 278 |
| Tear (die B), ppi | 228 | 231 | 222 |
| Compression Set, percent; 22 hours at 177° C. | 63.5 | 61.6 | 35.3 |

TABLE 11 (continued)

Cure Profile Determination of a Standard Liquid Injection Molding Formulation by Modulating Disk Rheometer and Physical Properties - 30 wt. % Ammonium Hydroxide in Water

| Experiment | 4 | 5 | 6 | 7 |
|---|---|---|---|---|
| Amount of Additive | 600 | 800 | 1,000 | 4,500 |
| MDR at 250° F. | | | | |
| T02, seconds | 29 | 27 | 30 | 34 |
| T90, seconds | 175 | 124 | 119 | 127 |
| Max. Torque, inch-lbs. | 14.28 | 14.7 | 17.57 | 10.57 |
| Peak Rate, inch-lbs./min. | 27.2 | 27.9 | 32.3 | 14.8 |
| MDR at 350° F. | | | | |
| T02, seconds | 04 | 04 | 05 | 05 |
| T90, seconds | 23 | 20 | 19 | 23 |
| Max. Torque, inch-lbs. | 17.08 | 14.68 | 16.78 | 13.4 |
| Peak Rate, inch-lbs./min. | 114 | 101.6 | 118 | 90.1 |
| Physical Properties | | | | |
| Shore A | 47.7 | 43.4 | 48 | 46.1 |
| Tensile, psi | 1103 | 1096 | 1203 | 1117 |
| % Elongation | 496 | 536 | 518 | 493 |
| 100% Modulus, psi | 250 | 226 | 260 | 248 |
| Tear (die B), ppi | 216 | 232 | 209 | 234 |
| Compression Set, percent; 22 hours at 177° C. | 36.9 | 41.3 | 36.9 | 54.3 |

TABLE 12

Cure Profile Determination of a Standard Liquid Injection Molding Formulation by Modulating Disk Rheometer and Physical Properties - 15 wt. % Ammonium Formate in Methanol

| Experiment | 1 | 2 | 3 |
|---|---|---|---|
| Amount of Additive | 80 | 200 | 400 |
| MDR at 250° F. | | | |
| T02, seconds | 66 | 62 | 79 |
| T90, seconds | 122 | 108 | 167 |
| Max. Torque, inch-lbs. | 16.13 | 15.32 | 15.12 |
| Peak Rate, inch-lbs./min. | 64.7 | 56.2 | 24.1 |
| MDR at 350° F. | | | |
| T02, seconds | 4 | 4 | 5 |
| T90, seconds | 20 | 17 | 20 |
| Max. Torque, inch-lbs. | 17.46 | 16.38 | 15.86 |
| Peak Rate, inch-lbs./min. | 131.0 | 130.6 | 117.8 |
| Physical Properties | | | |
| Shore A | 49.9 | 49.5 | 50.1 |
| Tensile, psi | 1078 | 1130 | 1018 |
| % Elongation | 459 | 463 | 442 |
| 100% Modulus, psi | 289 | 287 | 267 |
| Tear (die B), ppi | 232 | 220 | 219 |
| Compression Set, percent; 22 hours at 177° C. | 50.0 | 36.2 | 24.8 |

TABLE 13

Cure Profile Determination of a Standard Liquid Injection Molding Formulation by Modulating Disk Rheometer and Physical Properties-Ammonium Carbonate

| Experiment | 4 | 5 | 6 |
|---|---|---|---|
| Amount of Additive, ppm | 100 | 200 | 400 |
| Addition Point Relative to HMDZ | | | |
| MDR at 250° F. | | | |
| T02 | 39 | 48 | 37 |
| T90 | 95 | 82 | 82 |
| Max. Torque | 18.79 | 15.99 | 18.89 |
| | 55.4 | 56.6 | 49.9 |
| MDR at 350° F. | | | |
| T02 | 04 | 04 | 03 |
| T90 | 16 | 15 | 17 |
| Max. Torque | 19.02 | 20.19 | 19.62 |
| Peak Rate | 154.1 | 173.3 | 159.5 |
| Physical Properties | | | |
| Shore A | 53.9 | 52.1 | 52.7 |
| Tensile | 1061 | 1057 | 1142 |
| % Elongation | 384 | 388 | 423 |

TABLE 13-continued

Cure Profile Determination of a Standard Liquid Injection Molding Formulation by Modulating Disk Rheometer and Physical Properties-Ammonium Carbonate

| | | | |
|---|---|---|---|
| 100% Modulus | 321 | 319 | 313 |
| Tear (die B) | 204 | 231 | 217 |
| Compression Set, 22 hours at 177° C. | 27.7 | 42.4 | 34.2 |
| Experiment | 1 | 2 | 3 |
| Amount of Additive, ppm | 5000 | 5000 | 5000 |
| Addition Point Relative to HMDZ | Before | Middle | After |
| MDR at 250° F. | | | |
| T02 | 65 | 68 | 74 |
| T90 | 107 | 107 | 112 |
| Max. Torque | 19.11 | 18.82 | 18.06 |
| Peak Rate | 67.3 | 56.2 | 49.9 |
| MDR at 350° F. | | | |
| T02 | 4 | 4 | 3 |
| T90 | 15 | 14 | 14 |
| Max. Torque | 19.28 | 20.81 | 20.21 |
| Peak Rate | 168.4 | 187.8 | 177.3 |
| Physical Properties | | | |
| Shore A | 53.5 | 53.3 | 53.1 |
| Tensile | 1106 | 1251 | 1100 |
| % Elongation | 473 | 420 | 371 |
| 100% Modulus | 330 | 357 | 342 |
| Tear (die B) | 222 | 223 | 218 |
| Compression Set, 22 hours at 177° C. | 61.8 | 32.9 | 51.9 |

Although the prior art adds the hexamethyldisilazane and makes no teaching as to when in the process ammonium carbonate is added, these data clearly show that a difference occurs depending on when the ammonium carbonate is added in the process cycle.

TABLE 14

Cure Profile Determination of a Standard Liquid Injection Molding Formulation by Modulating Disk Rheometer and Physical Properties-Low Compression Set Additive is Alkylguanidinium Chloride

| Experiment | 1 |
|---|---|
| Amount of Additive | 300 |
| MDR at 250° F. | |
| T02, seconds | 75 |
| T90, seconds | 141 |
| Max. Torque, inch-lbs. | 19.7 |
| Peak Rate, inch-lbs./min. | 41.6 |
| MDR at 350° F. | |
| T02, seconds | 05 |
| T90, seconds | 16 |
| Max. Torque, inch-lbs. | 19.2 |
| Peak Rate, inch-lbs./min. | 158.3 |
| Physical Properties | |
| Shore A | 52.0 |
| Tensile, psi | 1211 |
| % Elongation | 445 |
| 100% Modulus, psi | 333 |
| Tear (die B), ppi | 241 |
| Compression Set, percent; 22 hours at 177° C. | 20.5 |

TABLE 15

Cure Profile Determination of a Standard Liquid Injection Molding Formulation by Modulating Disk Rheometer and Physical Properties-Low Compression Set Additive is a Mixture of Alkylguanidinium salts

| Experiment | 1 |
|---|---|
| Amount of Additive | 300 |
| MDR at 250° F. | |
| T02, seconds | 89 |
| T90, seconds | 200 |
| Max. Torque, inch-lbs. | 19.1 |
| Peak Rate, inch-lbs./min. | 22.9 |
| MDR at 350° F. | |
| T02, seconds | 06 |
| T90, seconds | 19 |
| Max. Torque, inch-lbs. | 19.2 |
| Peak Rate, inch-lbs./min. | 141.1 |
| Physical Properties | |
| Shore A | 52.5 |
| Tensile, psi | 1082 |
| % Elongation | 386 |
| 100% Modulus, psi | 345 |
| Tear (die B), ppi | 229 |
| Compression Set, percent; 22 hours at 177° C. | 16.8 |

TABLE 16

Cure Profile Determination of a Standard Liquid Injection Molding Formulation by Modulating Disk Rheometer and Physical Properties-Low Compression Set Additive is Pyridinium Chloride

| Experiment | 1 |
|---|---|
| Amount of Additive | 300 |
| MDR at 250° F. | |
| T02, seconds | 62 |
| T90, seconds | 100 |
| Max. Torque, inch-lbs. | 18.3 |
| Peak Rate, inch-lbs./min. | 22.4 |
| MDR at 350° F. | |
| T02, seconds | 05 |
| T90, seconds | 17 |
| Max. Torque, inch-lbs. | 18.7 |
| Peak Rate, inch-lbs./min. | 143.0 |
| Physical Properties | |
| Shore A | 51.7 |
| Tensile, psi | 1206 |
| % Elongation | 440 |
| 100% Modulus, psi | 334 |
| Tear (die B), ppi | 247 |
| Compression Set, percent; 22 hours at 177° C. | 14.7 |

TABLE 17

Cure Profile Determination of a Standard Liquid Injection Molding Formulation by Modulating Disk Rheometer and Physical Properties-Low Compression Set Additive is a Mixture of Tertiary Substituted Ammonium Chlorides

| Experiment | 1 |
|---|---|
| Amount of Additive | none |
| MDR at 250° F. | |
| T02, seconds | 39 |

TABLE 17-continued

Cure Profile Determination of a Standard Liquid Injection Molding Formulation by Modulating Disk Rheometer and Physical Properties-Low Compression Set Additive is a Mixture of Tertiary Substituted Ammonium Chlorides

| Experiment | 1 |
|---|---|
| T90, seconds | 344 |
| Max. Torque, inch-lbs. | 2.96 |
| Peak Rate, inch-lbs./min. | 1.2 |
| MDR at 350° F. | |
| T02, seconds | 18 |
| T90, seconds | 59 |
| Max. Torque, inch-lbs. | 18.3 |
| Peak Rate, inch-lbs./min. | 36.80 |
| Physical Properties | |
| Shore A | 51.0 |
| Tensile, psi | 1119 |
| % Elongation | 406 |
| 100% Modulus, psi | 318 |
| Tear (die B), ppi | 239 |
| Compression Set, percent; 22 hours at 177° C. | 12.3 |

TABLE 18

Cure Profile Determination of a Standard Liquid Injection Molding Formulation by Modulating Disk Rheometer and Physical Properties-Low Compression Set Additive is a Mixture of Halogen Substituted Alkyl Ammonium Chlorides

| Experiment | 1 |
|---|---|
| Amount of Additive | 300 |
| MDR at 250° F. | |
| T02, seconds | 58 |
| T90, seconds | 192 |
| Max. Torque, inch/lbs. | 18.3 |
| Peak Rate, inch-lbs./min. | 11.8 |
| MDR at 350° F. | |
| T02, seconds | 05 |
| T90, seconds | 18 |
| Max. Torque, inch-lbs. | 20.36 |
| Peak Rate, inch-lbs./min. | 159.2 |
| Physical Properties | |
| Shore A | 53.3 |
| Tensile, psi | 1085 |
| % Elongation | 403 |
| 100% Modulus, psi | 358 |
| Tear (die B), ppi | 231 |
| Compression Set, percent; 22 hours at 177° C. | 12.5 |

TABLE 19

Cure Profile Determination of a Standard Liquid Injection Molding Formulation by Modulating Disk Rheometer and Physical Properties-Low Compression Set Additive is a Mixture of Alkyl Glycinium Salts

| Experiment | 1 |
|---|---|
| Amount of Additive | 300 |
| MDR at 250° F. | |
| T02, seconds | 109 |
| T90, seconds | 261 |
| Max. Torque, inch/lbs. | 16.7 |
| Peak Rate, inch-lbs./min. | 10.2 |

TABLE 19-continued

Cure Profile Determination of a Standard Liquid Injection Molding Formulation by Modulating Disk Rheometer and Physical Properties-Low Compression Set Additive is a Mixture of Alkyl Glycinium Salts

| Experiment | 1 |
|---|---|
| MDR at 350° F. | |
| T02, seconds | 07 |
| T90, seconds | 20 |
| Max. Torque, inch/lbs. | 17.70 |
| Peak Rate, inch-lbs./min. | 133.1 |
| Physical Properties | |
| Shore A | 50.5 |
| Tensile, psi | 1250 |
| % Elongation | 448 |
| 100% Modulus, psi | 298 |
| Tear (die B), ppi | 241 |
| Compression Set, percent; 22 hours at 177° C. | 16.0 |

TABLE 20

Cure Profile Determination of a Standard Liquid Injection Molding Formulation by Modulating Disk Rheometer and Physical Properties-Low Compression Set Additive is a Mixture of Glycinium Ethyl Ester Chlorides

| Experiment | 1 |
|---|---|
| Amount of Additive | 300 |
| MDR at 250° F. | |
| T02, seconds | 65 |
| T90, seconds | 183 |
| Max. Torque, inch-lbs. | 15.9 |
| Peak Rate, inch-lbs./min. | 11.8 |
| MDR at 350° F. | |
| T02, seconds | 05 |
| T90, seconds | 18 |
| Max. Torque, inch-lbs. | 19.03 |
| Peak Rate, inch-lbs./min. | 148.3 |
| Physical Properties | |
| Shore A | 52.7 |
| Tensile, psi | 1140 |
| % Elongation | 425 |
| 100% Modulus, psi | 333 |
| Tear (die B), ppi | 237 |
| Compression Set, percent; 22 hours at 177° C. | 15.2 |

TABLE 21

Cure Profile Determination of a Standard Liquid Injection Molding Formulation by Modulating Disk Rheometer and Physical Properties-Low Compression Set Additive is a Mixture of Primary Guanidinium Chlorides

| Experiment | 1 |
|---|---|
| Amount of Additive | 300 |
| MDR at 250° F. | |
| T02, seconds | 70 |
| T90, seconds | 147 |
| Max. Torque, inch-lbs. | 19.5 |
| Peak Rate, inch-lbs./min. | 49.9 |
| MDR at 350° F. | |
| T02, seconds | 04 |

TABLE 21-continued

Cure Profile Determination of a Standard Liquid Injection Molding Formulation by Modulating Disk Rheometer and Physical Properties-Low Compression Set Additive is a Mixture of Primary Guanidinium Chlorides

| Experiment | 1 |
|---|---|
| T90, seconds | 15 |
| Max. Torque, inch-lbs. | 18.90 |
| Peak Rate, inch-lbs./min. | 170.2 |
| Physical Properties | |
| Shore A | 52.6 |
| Tensile, psi | 1215 |
| % Elongation | 377 |
| 100% Modulus, psi | 337 |
| Tear (die B), ppi | 237 |
| Compression Set, percent; 22 hours at 177° C. | 16.4 |

TABLE 22

Cure Profile Determination of a Standard Liquid Injection Molding Formulation by Modulating Disk Rheometer and Physical Properties - Low Compression Set Additive is a Mixture of Piperidinium Chlorides

| Experiment | 1 |
|---|---|
| Amount of Additive | 300 |
| MDR at 250° F. | |
| T02, seconds | 59 |
| T90, seconds | 174 |
| Max. Torque, inch-lbs. | 18.6 |
| Peak Rate, inch-lbs./min. | 19.6 |
| MDR at 350° F. | |
| T02, seconds | 05 |
| T90, seconds | 18 |
| Max. Torque, inch-lbs. | 19.5 |
| Peak Rate, inch-lbs./min. | 148 |
| Physical Properties | |
| Shore A | 53.5 |
| Tensile, psi | 1133 |
| % Elongation | 420 |
| 100% Modulus, psi | 345 |
| Tear (die B), ppi | 220 |
| Compression Set, percent; 22 hours at 177° C. | 14.7 |

TABLE 23

Cure Profile Determination of a Standard Liquid Injection Molding Formulation by Modulating Disk Rheometer and Physical Properties-Low Compression Set Additive is a Mixture of Alkyl Hydroxyl Ammonium Chlorides

| Experiment | 1 |
|---|---|
| Amount of Additive | 300 |
| MDR at 250° F. | |
| T02; seconds | 41 |
| T90, seconds | 79 |
| Max. Torque, inch-lbs. | 18.5 |
| Peak Rate, inch-lbs./min. | 46.8 |
| MDR at 350° F. | |
| T02, seconds | 04 |
| T90, seconds | 14 |
| Max. Torque, inch-lbs. | 19.6 |
| Peak Rate, inch-lbs./min. | 175.7 |

TABLE 23-continued

Cure Profile Determination of a Standard Liquid Injection Molding Formulation by Modulating Disk Rheometer and Physical Properties-Low Compression Set Additive is a Mixture of Alkyl Hydroxyl Ammonium Chlorides

| Experiment | 1 |
|---|---|
| Physical Properties | |
| Shore A | 53.5 |
| Tensile, psi | 1197 |
| % Elongation | 386 |
| 100% Modulus, psi | 356 |
| Tear (die B), ppi | 248 |
| Compression Set, percent; 22 hours at 177° C. | 14.4 |

TABLE 24

Cure Profile Determination of a Standard Liquid Injection Molding Formulation by Modulating Disk Rheometer and Physical Properties-Low Compression Set Additive is Pyridine N-Oxide

| Experiment | 1 |
|---|---|
| Amount of Additive | 300 |
| MDR at 250° F. | |
| T02, seconds | 111 |
| T90, seconds | 279 |
| Max. Torque, inch-lbs. | 17.4 |
| Peak Rate, inch-lbs./min. | 9.0 |
| MDR at 350° F. | |
| T02, seconds | 06 |
| T90, seconds | 21 |
| Max. Torque, inch-lbs. | 18.9 |
| Peak Rate, inch-lbs./min. | 126.8 |
| Physical Properties | |
| Shore A | 53.1 |
| Tensile, psi | 1129 |
| % Elongation | 338 |
| 100% Modulus, psi | 331 |
| Tear (die B), ppi | 230 |
| Compression Set, percent; 22 hours at 177° C. | 21.5 |

TABLE 25

Cure Profile Determination of a Standard Liquid Injection Molding Formulation by Modulating Disk Rheometer and Physical Properties-Low Compression Set Additive is a Mixture of Primary Alkyl Ammonium Chlorides

| Experiment | 1 |
|---|---|
| Amount of Additive | 300 |
| MDR at 250° F. | |
| T02, seconds | 67 |
| T90, seconds | 157 |
| Max. Torque, inch-lbs. | 17.51 |
| Peak Rate, inch-lbs./min. | 14.1 |
| MDR at 350° F. | |
| T02, seconds | 04 |
| T90, seconds | 14 |
| Max. Torque, inch-lbs. | 18.91 |
| Peak Rate, inch-lbs./min. | 165.0 |
| Physical Properties | |
| Shore A | 53.7 |
| Tensile, psi | 1214 |

TABLE 25-continued

Cure Profile Determination of a Standard Liquid Injection Molding Formulation by Modulating Disk Rheometer and Physical Properties-Low Compression Set Additive is a Mixture of Primary Alkyl Ammonium Chlorides

| Experiment | 1 |
|---|---|
| % Elongation | 435 |
| 100% Modulus, psi | 342 |
| Tear (die B), ppi | 240 |
| Compression Set, percent; 22 hours at 177° C. | 11.3 |

TABLE 26

Cure Profile Determination of a Standard Liquid Injection Molding Formulation by Modulating Disk Rheometer and Physical Properties-Low Compression Set Additive is a Mixture of Tertiary Alkyl Ammonium Chlorides

| Experiment | 1 |
|---|---|
| Amount of Additive | 300 |
| MDR at 250° F. | |
| T02, seconds | 41 |
| T90, seconds | 94 |
| Max. Torque, inch-lbs. | 18.04 |
| Peak Rate, inch-lbs./min. | 41.8 |
| MDR at 350° F. | |
| T02, seconds | 05 |
| T90, seconds | 14 |
| Max. Torque, inch-lbs. | 19.65 |
| Peak Rate, inch-lbs./min. | 174.4 |
| Physical Properties | |
| Shore A | 53.7 |
| Tensile, psi | 1160 |
| % Elongation | 415 |
| 100% Modulus, psi | 343 |
| Tear (die B), ppi | 239 |
| Compression Set, percent; 22 hours at 177° C. | 11.3 |

TABLE 27

Cure Profile Determination of a Standard Liquid Injection Molding Formulation by Modulating Disk Rheometer and Physical Properties-Low Compression Set Additive is a Mixture of Siloxane Tethered Ammonium Chlorides

| Experiment | 1 |
|---|---|
| Amount of Additive | 300 |
| MDR at 250° F. | |
| T02, seconds | 54 |
| T90, seconds | 81 |
| Max. Torque, inch-lbs. | 17.0 |
| Peak Rate, inch-lbs./min. | 57.4 |
| MDR at 350° F. | |
| T02, seconds | 03 |
| T90, seconds | 14 |
| Max. Torque, inch-lbs. | 19.23 |
| Peak Rate, inch-lbs./min. | 167.4 |
| Physical Properties | |
| Shore A | 53.8 |
| Tensile, psi | 1099 |
| % Elongation | 378 |
| 100% Modulus, psi | 347 |
| Tear (die B), ppi | 248 |

TABLE 27-continued

Cure Profile Determination of a Standard Liquid Injection Molding Formulation by Modulating Disk Rheometer and Physical Properties-Low Compression Set Additive is a Mixture of Siloxane Tethered Ammonium Chlorides

| Experiment | 1 |
|---|---|
| Compression Set, percent; 22 hours at 177° C. | 21 |

TABLE 28

Cure Profile Determination of a Standard Liquid Injection Molding Formulation by Modulating Disk Rheometer and Physical Properties-Low Compression Set Additive is t-Butyl Ammonium Acetate

| Experiment | 1 |
|---|---|
| Amount of Additive | 273 |
| MDR at 250° F. | |
| T02, seconds | 56 |
| T90, seconds | 187 |
| Max. Torque, inch-lbs. | 16.75 |
| Peak Rate, inch-lbs./min. | 15.4 |
| MDR at 350° F. | |
| T02, seconds | 08 |
| T90, seconds | 56 |
| Max. Torque, inch-lbs. | 19.29 |
| Peak Rate, inch-lbs./min. | 34.9 |
| Physical Properties | |
| Shore A | 53 |
| Tensile, psi | 1012 |
| % Elongation | 347 |
| 100% Modulus, psi | 318 |
| Tear (die B), ppi | 219 |
| Compression Set, percent; 22 hours at 177° C. | 23 |

TABLE 29

Cure Profile Determination of a Standard Liquid Injection Molding Formulation by Modulating Disk Rheometer and Physical Properties-Low Compression Set Additive is Glycine

| Experiment | 1 |
|---|---|
| Amount of Additive | 300 |
| MDR at 250° F. | |
| T02, seconds | 66 |
| T90, seconds | 192 |
| Max. Torque, inch-lbs. | 13.97 |
| Peak Rate, inch-lbs./min. | 21.7 |
| MDR at 350° F. | |
| T02, seconds | 05 |
| T90, seconds | 18 |
| Max. Torque, inch-lbs. | 17.99 |
| Peak Rate, inch-lbs./min. | 127.5 |
| Physical Properties | |
| Shore A | 51.6 |
| Tensile, psi | 1185 |
| % Elongation | 455 |
| 100% Modulus, psi | 310 |
| Tear (die B), ppi | 228 |
| Compression Set, percent; 22 hours at 177° C. | 15 |

TABLE 30

Cure Profile Determination of a Standard Millable Rubber Formulation by Modulating Disk Rheometer and Physical Properties-50 wt. % Dodecyltrimethylammonium Chloride in iso Propanol

| Experiment | 1 | 2 |
|---|---|---|
| Amount of Additive | Control | 300 |
| MDR at 250° F. | | |
| T02, seconds | 122 | 60 |
| T90, seconds | 302 | 338 |
| Max. Torque, inch-lbs. | 12.85 | 7.15 |
| Peak Rate, inch-lbs./min. | 9.8 | 1.6 |
| MDR at 350° F. | | |
| T02, seconds | 09 | 11 |
| T90, seconds | 24 | 61 |
| Max. Torque, inch-lbs. | 14.39 | 15.55 |
| Peak Rate, inch-lbs./min. | 81.9 | 51.1 |
| Physical Properties | | |
| Shore A | 52.5 | 55.8 |
| Tensile, psi | 1374 | 1331 |
| % Elongation | 742 | 777 |
| 100% Modulus, psi | 320 | 307 |
| Tear (die B), ppi | 290 | 289 |
| Compression Set, percent; 22 hours at 177° C. | 67 | 34.5 |

TABLE 31

Adhesion Control Measurements

| RUN # | 1 | 2 |
|---|---|---|
| Adhesion Promoter Amount | 0.25% | 0.00% |
| LCSA (amount) | NONE | NONE |
| Adhesion Enhancer, HOD$_3$D$_3^{vi}$OH, Amount | 0% | 0.50% |
| MDR @ 250° F. | | |
| T02 | | 0:29 |
| T90 | | 0:58 |
| Max. Torque | | 13.55 |
| Peak Rate | | 55.2 |
| MDR @ 350° F. | | |
| T02 | | 0:04 |
| T90 | | 0:15 |
| Max. Torque | | 15 |
| Peak Rate | | 134.2 |
| Physicals | | |
| Shore A | | 52 |
| Tensile | | 1100 |
| % Elong. | | 480 |
| 100% Mod. | | 270 |
| Tear (die-B) | | 241 |
| % Comp. Set (22 hrs. @ 177° C.) | | 46 |
| Adhesion (Failure Mode, A or C) (Lap Shear) | 286 A | <100 A |

**Adhesion Promoter is, Bis-(trimethylsilylpropyl)-Fumarate

TABLE 32

Adhesion Enhanced By HO D$_3$D$_3^{vi}$OH

| Run Number | 1 | 2 | 3 | 4 |
|---|---|---|---|---|
| Adhesion Promoter Amount | 0.25% | 0.25% | 0.25% | 0.25% |
| LCSA (amount) | DTMAB | NONE | DTMAB | DTMAC |
| | (65 ppm) | | (65 ppm) | (300 ppm) |
| Adhesion Enhancer Amount | 0.13% | 0.50% | 0.50% | 0.50% |
| MDR @ 250° F. | | | | |
| T02 | 1:00 | 0:28 | 0:58 | 0:29 |
| T90 | 2:42 | 0:56 | 3:27 | 1:20 |
| Max. Torque | 13.8 | 15.99 | 16.04 | — |
| Peak Rate | 11.8 | 69.8 | 8.9 | 28.4 |
| MDR @ 350° F. | | | | |
| T02 | 0:05 | 0:04 | 0:07 | 0:04 |
| T90 | 0:27 | 0:25 | 0:24 | 1:03 |
| Max. Torque | 17.53 | 17.47 | 18.16 | 16.97 |
| Peak Rate | 135.4 | 154.4 | 128.4 | 119.1 |
| Physicals | | | | |
| Shore A | | 53 | 54.7 | 55.2 |
| Tensile | | 1166 | 1124 | 1110 |
| % Elong. | | 478 | 419 | 409 |
| 100% Mod. | | 290 | 325 | 329 |
| Tear (die-B) | | 269 | 225 | 217 |
| % Comp. Set (22 hrs. @ 177° C.) | 19.9 | 42.7 | 22.3 | 21.2 |
| Adhesion (Failure Mode, A or C) (Lap Shear) | >314 C | >350 C | >283 C | 479 C |

**Adhesion Promoter is Bis-(trimethylsilylpropyl)-Fumarate

TABLE 33

Adhesion Enhanced By HOD$_{25}$D$^{vi}$OH

| RUN # | 1 |
|---|---|
| Adhesion Promoter Amount. | 0.25% |
| LCSA (amount) | DTMAC (300 ppm) |
| Adhesion Enhancer Amount | 0.50% |
| MDR @ 250° F. | |
| T02 | 0:36 |
| T90 | 1:39 |
| Max. Torque | 10.08 |
| Peak Rate | 19.6 |
| MDR @ 350° F. | |
| T02 | 0:04 |
| T90 | 0:24 |
| Max. Torque | 16.14 |
| Peak Rate | 128.8 |
| Physicals | |
| Shore A | 53 |
| Tensile | 1090 |
| % Elong. | 392 |
| 100% Mod. | 312 |
| Tear (die-B) | 194 |
| % Comp. Set (22 hrs. @ 177° C.) | 24.3 |
| Adhesion (Failure Mode, A or C) (Lap Shear) | 430 C |

**Adhesion Promoter is Bis-(trimethylsilylpropyl)-Fumarate

TABLE 34

Adhesion Enhanced By HOD$_6$OH

| RUN # | 1 |
|---|---|
| Adhesion Promoter Amount. | 0.25% |
| LCSA (amount) | DTMAC |
|  | (300 ppm) |
| Adhesion Enhancer Amount | 0.50% |
| MDR @ 250° F. |  |
| T02 | 0:36 |
| T90 | 1:32 |
| Max. Torque | 10.62 |
| Peak Rate | 21.1 |
| MDR @ 350° F. |  |
| T02 | 0:04 |
| T90 | 0:27 |
| Max. Torque | 16.66 |
| Peak Rate | 133.1 |
| Physicals |  |
| Shore A | 53.2 |
| Tensile | 1275 |
| % Elong. | 448 |
| 100% Mod. | 307 |
| Tear (die-B) | 197 |
| % Comp. Set | 27.3 |
| (22 hrs. @ 177° C.) |  |
| Adhesion (Failure Mode, A or C) (Lap Shear) | >413 C |

**Adhesion Promoter is Bis-(trimethylsilylpropyl)-Fumarate

TABLE 35

Adhesion Enhanced By HOD$_{10}$D$^{vi}$OH

| RUN # | 1 |
|---|---|
| Adhesion Promoter Amount. | 0.25 |
| LCSA (amount) | DTMAC |
|  | (300 ppm) |
| Adhesion Enhancer Amount | 0.50% |
| MDR @ 250° F. |  |
| T02 | 43 |
| T90 | 123 |
| Max. Torque | 5.49 |
| Peak Rate | 7.5 |
| MDR @ 350° F. |  |
| T02 | 5 |
| T90 | 78 |
| Max. Torque | 17.51 |
| Peak Rate | 115.6 |
| Physicals |  |
| Shore A | 52.8 |
| Tensile | 1287 |
| % Elong. | 446 |
| 100% Mod. | 318 |
| Tear (die-B) | 213 |
| % Comp. Set | 24.1 |
| (22 hrs. @ 177° C.) |  |
| Adhesion (Failure Mode, A or C) (Lap Shear) | >250 C |

**Adhesion Promoter is Bis-(trimethylsilylpropyl)-Fumarate

The data presented in tables 31 through 35 is a measure of adhesive and cohesive failure of a liquid injection molding composition bonded against a substrate composed of 30 weight percent glass filled polybutylene terephthalate. The bis-(trimethylsilylpropyl)-fumarate while it increases adhesive strength did not increase it to where there was cohesive failure (adhesive failure, failure mode A; cohesive failure, failure mode C). Table 31 demonstrates that an adhesion enhancer does not impart significant adhesion or cohesion to a liquid injection molding composition. Table 32 demonstrates that the low compression set additive compounds (LCSA) of the present invention do not affect adhesive or cohesive failure but do continue to improve compression set of the composition independently of the presence of any adhesion promoters or enhancers. The remaining tables are exemplary of the various adhesion enhancing compounds of the present invention. The abbreviations used in Tables 31 through 35 are as follows: 1) DTMAC stands for dodecyltrimethylammonium chloride and 2) DTMAB stands for dodecyltrimethylammonium bromide.

Having described the invention that which is claimed is:

1. A curable silicone elastomer composition comprising:
   1) a curable silicone elastomer;
   2) a salt of a cationic organic nitrogen compound;
   3) bis(trimethoxysilylpropyl)fumarate; and
   4) a silanol terminated polymer having the formula:

where each of $R^{A1}$, $R^{A2}$, $R^{A3}$, and $R^{A4}$, is independently a one to forty carbon atom monovalent organic radical and $R^{A5}$ is a two to forty carbon atom monovalent olefinic organic radical where the subscript y' ranges from 0 to about 50 and the subscript x' ranges from 0 or 1 to about 100, and a weight percent alkenyl content that ranges from zero when the subscript y' is zero to about 25 weight percent when the subscript y' is greater than zero wherein the compression set of the cured silicone elastomer is less than the compression set of the cured silicone elastomer free of said nitrogen compound.

2. The curable composition of claim 1 wherein said curable silicone elastomer comprises:
   1) an alkenyl organopolysiloxane and
   2) a hydrogen containing silicon compound selected from the group consisting of hydrogen containing silanes and hydrogen containing organopolysiloxanes.

3. The curable composition of claim 2 wherein the cationic nitrogen compound is selected from the group consisting essentially of:
   1) monovalent cationic nitrogen compounds of the formula:
      $R^{N1}_a R^{N2}_b R^{N3}_c R^{N4}_d N^+$ where $R^{N1}$ is selected from the group consisting of hydrogen and one to forty carbon atom monovalent organic radicals and $R^{N2}$, $R^{N3}$, and $R^{N4}$ are each independently selected from the group consisting of one to forty carbon atom monovalent organic radicals with the subscript a having values ranging from 0 to 3 and the subscripts b, c, and d independently having values ranging from 0 to 4 subject to the limitation that a+b+c+d is always equal to 4;
   2) cationic cyclo-aliphatic nitrogen heterocycle compounds of the formula:

where the subscript e is 0, 1 or 2, Q is a one to forty carbon atom monovalent organic radical, the subscript f is an integer of 4 or greater, $R^{N5}$ is a one to forty carbon atom monovalent organic radical and the subscript g is 0, 1 or 2;
   3) cationic cyclo-aromatic nitrogen heterocycle compounds of the formula:

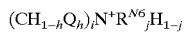

where the subscript h is 0 or 1, Q is a one to forty carbon atom monovalent organic radical, the subscript i is an integer of 5 or greater, $R^{N6}$ is a one to forty carbon atom monovalent organic radical and the subscript j is 0 or 1; and 4) cationic nitrogen compounds containing a nitrogen double-bonded to a carbon atom.

4. The composition of claim 3 wherein said cationic nitrogen compound is the monovalent cationic nitrogen compound of (1).

5. The composition of claim 3 wherein said cationic nitrogen compound is the cyclo-aliphatic nitrogen heterocycle compound of (2).

6. The composition of claim 3 wherein said cationic nitrogen compound is the cyclo-aromatic nitrogen heterocycle compound of (3).

7. The composition of claim 3 wherein said cationic nitrogen compound is the nitrogen compound containing a nitrogen double-bonded to a carbon atom of (4).

8. The composition of claim 4 wherein said monovalent cationic nitrogen compound is dodecyltrimethylammonium ion.

9. The composition of claim 5 wherein said cyclo-aliphatic nitrogen heterocycle compound is piperidinium ion.

10. The composition of claim 6 wherein said cyclo-aromatic nitrogen heterocycle compound is pyridinium ion.

11. The composition of claim 7 wherein said cationic nitrogen compound containing a nitrogen double-bonded to a carbon atom is guanidinium ion.

12. A curable silicone elastomer composition comprising:
   1) a curable silicone elastomer;
   2) a salt of a cationic organic nitrogen compound;
   3) bis(trimethoxysilylpropyl)fumarate; and
   4) a silanol terminated polymer having the formula:

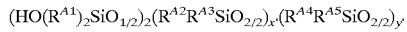

where each of $R^{A1}$, $R^{A2}$, $R^{A3}$, and $R^{A4}$, is independently a one to forty carbon atom monovalent organic radical and $R^{A5}$ is a two to forty carbon atom monovalent olefinic organic radical where the subscript y' ranges from 0 to about 50 and the subscript x' ranges from 0 or 1 to about 100, and a weight percent alkenyl content that ranges from zero when the subscript y' is zero to about 25 weight percent when the subscript y' is greater than zero wherein the compression set of the cured silicone elastomer is less than the compression set of the cured silicone elastomer free of said nitrogen compound and wherein said cured silicone elastomer adheres to a polymeric substrate.

13. The curable composition of claim 12 wherein said curable silicone elastomer comprises:
   1) an alkenyl organopolysiloxane and
   2) a hydrogen containing silicon compound selected from the group consisting of hydrogen containing silanes and hydrogen containing organopolysiloxanes.

14. The curable composition of claim 13 wherein the cationic nitrogen compound is selected from the group consisting essentially of:
   1) monovalent cationic nitrogen compounds of the formula:
      $R^{N1}{}_a R^{N2}{}_b R^{N3}{}_c R^{N4}{}_d N^+$ where $R^{N1}$ is selected from the group consisting of hydrogen and one to forty carbon atom monovalent organic radicals and $R^{N2}$, $R^{N3}$, and $R^{N4}$ are each independently selected from the group consisting of one to forty carbon atom monovalent organic radicals with the subscript a having values ranging from 0 to 3 and the subscripts b, c, and d independently having values ranging from 0 to 4 subject to the limitation that a+b+c+d is always equal to 4;

2) cationic cyclo-aliphatic nitrogen heterocycle compounds of the formula:

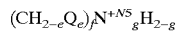

where the subscript e is 0, 1 or 2, Q is a one to forty carbon atom monovalent organic radical, the subscript f is an integer of 4 or greater, $R^{N5}$ is a one to forty carbon atom monovalent organic radical and the subscript g is 0, 1 or 2;

3) cationic cyclo-aromatic nitrogen heterocycle compounds of the formula:

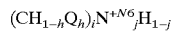

where the subscript h is 0 or 1, Q is a one to forty carbon atom monovalent organic radical, the subscript i is an integer of 5 or greater, $R^{N6}$ is a one to forty carbon atom monovalent organic radical and the subscript j is 0 or 1; and 4) cationic nitrogen compounds containing a nitrogen double-bonded to a carbon atom.

15. The composition of claim 14 wherein said cationic nitrogen compound is the monovalent cationic nitrogen compound of (1).

16. The composition of claim 14 wherein said cationic nitrogen compound is the cyclo-aliphatic nitrogen heterocycle compound of (2).

17. The composition of claim 14 wherein said cationic nitrogen compound is the cyclo-aromatic nitrogen heterocycle compound of (3).

18. The composition of claim 14 wherein said cationic nitrogen compound is the cationic nitrogen compound containing a nitrogen double-bonded to a carbon atom of (4).

19. The composition of claim 15 wherein said monovalent cationic nitrogen compound is dodecyltrimethylammonium ion.

20. The composition of claim 16 wherein said cyclo-aliphatic nitrogen heterocycle compound is piperidinium ion.

21. The composition of claim 17 wherein said cyclo-aromatic nitrogen heterocycle compound is pyridinium ion.

22. The composition of claim 18 wherein said cationic nitrogen compound containing a nitrogen double-bonded to a carbon atom is guanidinium ion.

23. The composition of claim 12 wherein said polymeric substrate is selected from the group consisting of thermosetting polymers and thermoplastic polymers.

24. The composition of claim 23 wherein said curable silicone elastomer comprises:
   1) an alkenyl organopolysiloxane and
   2) a hydrogen containing silicon compound selected from the group consisting of hydrogen containing silanes and hydrogen containing organopolysiloxanes.

25. The curable composition of claim 24 wherein cationic nitrogen compound is selected from the group consisting essentially of:
   1) monovalent cationic nitrogen compounds of the formula:
      $R^{N1}{}_a R^{N2}{}_b R^{N3}{}_c R^{N4}{}_d N^+$ where $R^{N1}$ is selected from the group consisting of hydrogen and one to forty carbon atom monovalent organic radicals and $R^{N2}$, $R^{N3}$, and $R^{N4}$ are each independently selected from the group consisting of one to forty carbon atom monovalent organic radicals with the subscript a having values ranging from 0 to 3 and the subscripts b, c, and d independently having values ranging from 0 to 4 subject to the limitation that a+b+c+d is always equal to 4;

2) cationic cyclo-aliphatic nitrogen heterocycle compounds of the formula:

$$(CH_{2-e}Q_e)_f N^+ R^{N5}_g H_{2-g}$$

where the subscript e is 0, 1 or 2, Q is a one to forty carbon atom monovalent organic radical, the subscript f is an integer of 4 or greater, $R^{N5}$ is a one to forty carbon atom monovalent organic radical and the subscript g is 0, 1 or 2;

3) cationic cyclo-aromatic nitrogen heterocycle compounds of the formula:

$$(CH_{1-h}Q_h)_i N^+ R^{N6}_j H_{1-j}$$

where the subscript h is 0 or 1, Q is a one to forty carbon atom monovalent organic radical, the subscript i is an integer of 5 or greater, $R^{N6}$ is a one to forty carbon atom monovalent organic radical and the subscript j is 0 or 1; and 4) cationic nitrogen compounds containing a nitrogen double-bonded to a carbon atom.

26. A curable silicone elastomer composition consisting essentially of:

1) a curable silicone elastomer;
2) a salt of a cationic organic nitrogen compound;
3) bis(trimethoxysilylpropyl)fumarate; and
4) a silanol terminated polymer having the formula:

$$(HO(R^{A1})_2SiO_{1/2})_2(R^{A2}R^{A3}SiO_{2/2})_{x'}(R^{A4}R^{A5}SiO_{2/2})_{y'}$$

where each of $R^{A1}$, $R^{A2}$, $R^{A3}$, and $R^{A4}$, is independently a one to forty carbon atom monovalent organic radical and $R^{A5}$ is a two to forty carbon atom monovalent olefinic organic radical where the subscript y' ranges from 0 to about 50 and the subscript x' ranges from 0 or 1 to about 100, and a weight percent alkenyl content that ranges from zero when the subscript y' is zero to about 25 weight percent when the subscript y' is greater than zero wherein the compression set of the cured silicone elastomer is less than the compression set of the cured silicone elastomer free of said nitrogen compound.

* * * * *